(12) United States Patent
Zhamu et al.

(10) Patent No.: US 10,601,034 B2
(45) Date of Patent: Mar. 24, 2020

(54) METHOD OF PRODUCING PROTECTED PARTICLES OF ANODE ACTIVE MATERIALS FOR LITHIUM BATTERIES

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 143 days.

(21) Appl. No.: 15/906,207

(22) Filed: Feb. 27, 2018

(65) Prior Publication Data

US 2019/0260015 A1 Aug. 22, 2019

Related U.S. Application Data

(63) Continuation-in-part of application No. 15/901,367, filed on Feb. 21, 2018.

(51) Int. Cl.
*H01M 4/00* (2006.01)
*H01M 4/36* (2006.01)
(Continued)

(52) U.S. Cl.
CPC .......... *H01M 4/366* (2013.01); *H01M 4/386* (2013.01); *H01M 4/483* (2013.01); *H01M 4/523* (2013.01);
(Continued)

(58) Field of Classification Search
CPC .......... H01M 4/523; H01M 2004/027; H01M 4/587; H01M 10/0525; H01M 4/366
See application file for complete search history.

(56) References Cited

U.S. PATENT DOCUMENTS 2,798,878 A 7/1957 Hummers
3,836,511 A 9/1974 O'farrell et al.
(Continued)

FOREIGN PATENT DOCUMENTS

JP 1275613 A 11/1989
WO 2017172104 A1 10/2017

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.
(Continued)

*Primary Examiner* — Cynthia H Kelly
*Assistant Examiner* — Monique M Wills

(57) ABSTRACT

A method of producing a powder mass for a lithium battery, the method comprising: (a) Providing a solution containing a sulfonated elastomer dissolved in a solvent or a precursor in a liquid form or dissolved in a solvent; (b) dispersing a plurality of particles of an anode active material in the solution to form a slurry; and (c) dispensing the slurry and removing the solvent and/or polymerizing/curing the precursor to form the powder mass, wherein the powder mass comprises multiple particulates and at least a particulate is composed of one or a plurality of particles of an anode active material being encapsulated by a thin layer of sulfonated elastomer having a thickness from 1 nm to 10 µm, a fully recoverable tensile strain from 2% to 800%, and a lithium ion conductivity from $10^{-7}$ S/cm to $5 \times 10^{-2}$ S/cm at room temperature.

19 Claims, 6 Drawing Sheets

(51) Int. Cl.
| | |
|---|---|
| H01M 4/60 | (2006.01) |
| H01M 4/52 | (2010.01) |
| H01M 4/38 | (2006.01) |
| H01M 4/587 | (2010.01) |
| H01M 10/0525 | (2010.01) |
| H01M 4/48 | (2010.01) |
| H01M 4/02 | (2006.01) |

(52) U.S. Cl.
CPC .......... *H01M 4/587* (2013.01); *H01M 4/604* (2013.01); *H01M 10/0525* (2013.01); *H01M 2004/027* (2013.01)

(56) References Cited

U.S. PATENT DOCUMENTS

| | | | |
|---|---|---|---|
| 4,720,910 | A | 1/1988 | Rourke et al. |
| 5,057,339 | A | 10/1991 | Ogawa |
| 5,270,417 | A | 12/1993 | Soga et al. |
| 5,350,647 | A | 9/1994 | Hope et al. |
| 5,424,151 | A | 6/1995 | Koksbang et al. |
| 5,434,021 | A | 7/1995 | Fauteux et al. |
| 5,536,599 | A | 7/1996 | Alamgir et al. |
| 5,648,187 | A | 7/1997 | Skotheim |
| 5,961,672 | A | 10/1999 | Skotheim et al. |
| 6,025,094 | A | 2/2000 | Visco et al. |
| 6,447,952 | B1 | 9/2002 | Spiegel et al. |
| 6,451,484 | B1 | 9/2002 | Han et al. |
| 6,515,101 | B1 | 2/2003 | Sheares |
| 6,620,547 | B1 | 9/2003 | Sung et al. |
| 6,733,924 | B1 | 5/2004 | Skotheim et al. |
| 6,797,428 | B1 | 9/2004 | Skotheim et al. |
| 6,936,381 | B2 | 8/2005 | Skotheim et al. |
| 7,247,408 | B2 | 7/2007 | Skotheim et al. |
| 7,282,295 | B2 | 10/2007 | Visco et al. |
| 7,282,296 | B2 | 10/2007 | Visco et al. |
| 7,282,302 | B2 | 10/2007 | Visco et al. |
| 7,618,678 | B2 | 11/2009 | Mao et al. |
| 8,597,828 | B2 | 12/2013 | Martinet et al. |
| 10,084,182 | B2 | 9/2018 | Pan et al. |
| 2002/0182488 | A1 | 12/2002 | Cho et al. |
| 2002/0195591 | A1 | 12/2002 | Ravet et al. |
| 2003/0180619 | A1 | 9/2003 | Tamura et al. |
| 2004/0018430 | A1* | 1/2004 | Holman ............. H01M 4/13 429/233 |
| 2005/0034993 | A1 | 2/2005 | Gozdz et al. |
| 2005/0098914 | A1 | 5/2005 | Varma et al. |
| 2005/0118508 | A1 | 6/2005 | Yong et al. |
| 2005/0136330 | A1 | 6/2005 | Mao et al. |
| 2007/0218369 | A1 | 9/2007 | Kaiduka et al. |
| 2007/0289479 | A1 | 12/2007 | Horton |
| 2008/0248393 | A1 | 10/2008 | Richard et al. |
| 2008/0318128 | A1 | 12/2008 | Simoneau et al. |
| 2009/0169725 | A1 | 7/2009 | Zhamu et al. |
| 2010/0112454 | A1 | 5/2010 | Visco et al. |
| 2010/0143798 | A1 | 6/2010 | Zhamu et al. |
| 2010/0173198 | A1 | 7/2010 | Zhamu et al. |
| 2011/0059361 | A1 | 3/2011 | Wilkening et al. |
| 2011/0104571 | A1 | 5/2011 | Zhamu et al. |
| 2011/0177388 | A1 | 7/2011 | Bae et al. |
| 2011/0244337 | A1 | 10/2011 | Ohta et al. |
| 2011/0262816 | A1 | 10/2011 | Amatucci |
| 2012/0064409 | A1 | 3/2012 | Zhamu et al. |
| 2012/0070708 | A1 | 3/2012 | Ohira et al. |
| 2012/0088154 | A1 | 4/2012 | Liu et al. |
| 2012/0282524 | A1* | 11/2012 | Kono ............. H01M 4/525 429/223 |
| 2013/0171339 | A1 | 7/2013 | Wang et al. |
| 2013/0224603 | A1 | 8/2013 | Chen et al. |
| 2014/0072879 | A1 | 3/2014 | Chen et al. |
| 2014/0147738 | A1 | 5/2014 | Chen et al. |
| 2014/0147751 | A1 | 5/2014 | Yang et al. |
| 2014/0154572 | A1 | 6/2014 | Singh et al. |
| 2014/0234702 | A1 | 8/2014 | Zhang et al. |
| 2014/0235513 | A1 | 8/2014 | Kverel et al. |
| 2014/0363746 | A1 | 12/2014 | He et al. |
| 2015/0044556 | A1 | 2/2015 | Wang et al. |
| 2015/0180000 | A1 | 6/2015 | Roumi |
| 2015/0221935 | A1 | 8/2015 | Zhou et al. |
| 2015/0244025 | A1 | 8/2015 | Rhee et al. |
| 2015/0318532 | A1 | 11/2015 | Manthiram et al. |
| 2015/0325844 | A1 | 11/2015 | Inoue |
| 2016/0013481 | A1 | 1/2016 | Jeong et al. |
| 2016/0043384 | A1 | 2/2016 | Zhamu et al. |
| 2016/0087266 | A1 | 3/2016 | Muldoon et al. |
| 2016/0126543 | A1 | 5/2016 | Ota et al. |
| 2016/0149216 | A1 | 5/2016 | Mizuno et al. |
| 2016/0181611 | A1 | 6/2016 | Cho et al. |
| 2016/0218341 | A1 | 7/2016 | Kumar et al. |
| 2016/0351877 | A1 | 12/2016 | Kusachi et al. |
| 2016/0351909 | A1 | 12/2016 | Bittner et al. |
| 2016/0372743 | A1 | 12/2016 | Cho et al. |
| 2016/0372784 | A1 | 12/2016 | Hayner et al. |
| 2017/0018799 | A1 | 1/2017 | Jeong |
| 2017/0047584 | A1 | 2/2017 | Hwang et al. |
| 2017/0062830 | A1 | 3/2017 | Bao et al. |
| 2017/0098824 | A1 | 4/2017 | Fasching et al. |
| 2017/0098856 | A1 | 4/2017 | Zhamu et al. |
| 2017/0117535 | A1 | 4/2017 | Yoon et al. |
| 2017/0117538 | A1 | 4/2017 | Bendimerad et al. |
| 2017/0117589 | A1 | 4/2017 | Tajima et al. |
| 2017/0141387 | A1 | 5/2017 | Hayner et al. |
| 2017/0166722 | A1 | 6/2017 | Zhamu et al. |
| 2017/0179468 | A1 | 6/2017 | Fanous et al. |
| 2017/0194648 | A1 | 7/2017 | Bucur et al. |
| 2017/0288211 | A1 | 10/2017 | Zhamu et al. |
| 2017/0309917 | A1 | 10/2017 | Lee et al. |
| 2017/0338472 | A1 | 11/2017 | Zhamu et al. |
| 2017/0338474 | A1 | 11/2017 | Lee et al. |
| 2017/0338490 | A1 | 11/2017 | Xiao et al. |
| 2018/0233736 | A1 | 8/2018 | Zhamu et al. |
| 2018/0241031 | A1 | 8/2018 | Pan et al. |
| 2018/0241032 | A1 | 8/2018 | Pan et al. |
| 2018/0248173 | A1 | 8/2018 | Pan et al. |
| 2018/0287142 | A1 | 10/2018 | Zhamu et al. |
| 2018/0294475 | A1 | 10/2018 | Zhamu et al. |
| 2018/0294476 | A1 | 10/2018 | Zhamu et al. |

OTHER PUBLICATIONS

An et al., "Large-Scale Synthesis of High Quality Trigonal Selenium Nanowires" European Journal of Inorganic Chemistry (2003) vol. 17, pp. 3250-3255.

Arai et al., "Versatile supramolecular cross-linker: a rotaxane cross-linker that directly endows vinyl polymers with movable cross-links" Chemistry (2013) vol. 19, pp. 5917-5923.

Buonerba et al., "Novel Synthetic Strategy for the Sulfonation of Polybutadiene and Styrene-Butadiene Copolymers" Macromolecules (2013) vol. 46, pp. 778-784.

Chen et al., "Selenium nanowires and nanotubes synthesized via a facile template-free solution method" Materials Research Bulletin (2010) vol. 45, pp. 699-704.

Dwivedi et al., "An Organic Acid-induced Synthesis and Characterization of Selenium Nanoparticles" Journal of Nanotechnology (2011) Article ID 651971, 6 pages.

Elabd et al., "Sulfonation and Characterization of Poly(styrene-isobutylene-styrene) Triblock Copolymers at High Ion-Exchange Capacities" Polymer (2004) vol. 45, pp. 3037-3043.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Ji et al., "A highly ordered nanostructured carbon-sulphur cathode for lithium-sulphur batteries" Nature Materials (2009) vol. 8, pp. 500-506.

Karlicky et al., "Halogenated Graphenes: Rapidly Growing Family of Graphene Derivatives" ACS Nano (2013) vol. 1, No. 8, pp. 6434-6464.

(56) References Cited

OTHER PUBLICATIONS

Li et al., "Mixed Surfactant Template Method for Preparation of Nanometer Selenium" E-Journal of Chemistry (2009) vol. 6, No. S1, pp. S304-S310.
Lin et al., "Observation in the Growth of Selenium Nanoparticles" Journal of Chinese Chemical Society (2004) vol. 51, No. 2, pp. 239-242.
Luesakul et al., "Shape-controlled synthesis of cubic-like selenium nanoparticles via the self-assembly method" Carbohydrate Polymers (2016) vol. 153, pp. 435-444.
PCT/US17/18452 International Search Report and Written Opinion dated Apr. 25, 2017, 9 pages.
PCT/US18/16404 International Search Report and Written Opinion dated Apr. 13, 2018, 11 pages.
PCT/US18/16410 International Search Report and Written Opinion dated Apr. 20, 2018, 10 pages.
PCT/US18/16418 International Search Report and Written Opinion dated Apr. 25, 2018, 9 pages.
PCT/US18/16423 International Search Report and Written Opinion dated Apr. 24, 2018, 9 pages.
PCT/US18/16426 International Search Report and Written Opinion dated Apr. 24, 2018, 9 pages.
PCT/US18/16431 International Search Report and Written Opinion dated Apr. 26, 2018, 6 pages.
PCT/US18/20892 International Search Report and Written Opinion dated May 2, 2018, 6 pages.
Xie et al., "A Novel Method for Synthesis of Sulfonated SBS Ionomers by Ring-Opening Reaction of Epoxidized SBS, Their Characterization, Properties, and Blends" Journal of Elastomers and Plastics (2007) vol. 39, pp. 317-334.
Zeng et al., "Solvothermal synthesis of trigonal selenium with butterfly-like microstructure" Particuology (2013) vol. 11, No. 5, pp. 614-617.
Zhang et al., "Synthesis of selenium nanoparticles in the presence of polysaccharides" Materials Letters (2004) vol. 58, No. 21, pp. 2590-2594.
Habib et al., "Elastomeric Nanocomposite Based on Exfoliated Graphene Oxide and Its Characteristics without Vulcanization" Hindawi Journal of Nanomaterials (2017) vol. 2017, Article ID 8543137, 11 pages.
Liu et al., "Solutions for the problems of silicon-carbon anode materials for lithium-ion batteries" Royal Society Open Science (2018) vol. 5, p. 172370.
PCT/US18/25135 International Search Report and Written Opinion dated Jun. 27, 2018, 14 pages.
PCT/US18/25150 International Search Report and Written Opinion dated Jun. 29, 2018, 14 pages.
PCT/US18/25163 International Search Report and Written Opinion dated Jul. 27, 2018, 19 pages.
PCT/US19/19061 International Search Report and Written Opinion dated May 13, 2019, 11 pages.
PCT/US19/19062 International Search Report and Written Opinion dated May 13, 2019, 9 pages.
PCT/US19/21137 International Search Report and Written Opinion dated Jun. 18, 2019, 13 pages.
U.S. Appl. No. 15/901,367 Nonfinal Office Action dated Jun. 10, 2019, 12 pages.
Vaikhanski et al., "Fiber-reinforced composite foam from expandable PVC microspheres" Composites Part A (2003) vol. 34, pp. 1245-1253.
Choi et al., "Highly elastic binders integrating polyrotaxanes for silicon microparticle anodes in lithium ion batteries" Science (2017) vol. 357, No. 6348, pp. 279-283.
KR-10-2015-0044333 English language translation.
PCT/US18/25160 International Search Report and Written Opinion dated Nov. 21, 2018, 12 pages.
PCT/US18/43421 International Search Report and Written Report dated Oct. 11, 2018, 13 pages.
PCT/US18/43435 International Search Report and Written Opinion dated Jan. 7, 2019, 14 pages.
PCT/US19/18931 International Search Report and Written Opinion dated May 8, 2019, 13 pages.
PCT/US19/20214 International Search Report and Written Opinion dated May 2, 2019, 7 pages.
PCT/US19/20222 International Search Report and Written Opinion dated May 3, 2019, 7 pages.
U.S. Appl. No. 14/999,080 Nonfinal Office Action dated Nov. 9, 2018.
U.S. Appl. No. 15/442,803 Nonfinal Office Action dated Dec. 28, 2018, 24 pages.
U.S. Appl. No. 15/442,807 Nonfinal Office Action dated Dec. 14, 2018, 7 pages.
U.S. Appl. No. 15/483,342 Final Office Action dated Mar. 22, 2019, 52 pages.
U.S. Appl. No. 15/483,342 Nonfinal Office Action dated Nov. 2, 2018, 37 pages.
U.S. Appl. No. 15/483,347 Final Office Action dated Apr. 16, 2019, 23 pages.
U.S. Appl. No. 15/483,347 Nonfinal Office Action dated Nov. 2, 2018, 20 pages.
U.S. Appl. No. 15/483,348 Final Office Action dated Apr. 9, 2019, 28 pages.
U.S. Appl. No. 15/483,348 Nonfinal Office Action dated Nov. 21, 2018, 22 pages.
Wikipedia contributors. "Anode." Wikipedia, The Free Encyclopedia, Mar. 4, 2019, Web. Mar. 18, 2019. (Year: 2019).
Wikipedia contributors. "Molar mass distribution." Wikipedia, The Free Encyclopedia, Feb. 1, 2019, Web. Mar. 18, 2019. (Year: 2019).

\* cited by examiner

METHOD OF PRODUCING PROTECTED PARTICLES OF ANODE ACTIVE MATERIALS FOR LITHIUM BATTERIES

CROSS REFERENCE TO RELATED APPLICATIONS

The present application is a continuation-in-part of U.S. patent application Ser. No. 15/901,367, filed on Feb. 21, 2018, which is hereby incorporated by reference.

FIELD OF THE INVENTION

The present disclosure relates generally to the field of rechargeable lithium battery and, more particularly, to the anode active materials in the form of elastomer-encapsulated particles and the process for producing same.

BACKGROUND OF THE INVENTION

A unit cell or building block of a lithium-ion battery is typically composed of an anode current collector, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode (anode) side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil). Typically the former three materials form a separate, discrete anode layer and the latter one forms another discrete layer.

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles.

Presumably, the protective matrix provides a cushioning effect for particle expansion or shrinkage, and prevents the electrolyte from contacting and reacting with the electrode active material. Examples of high-capacity anode active particles are Si, Sn, and $SnO_2$. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes and electrode active materials have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pre-graphitic carbon may have too many lithium-trapping sites that irreversibly capture lithium during the first few cycles, resulting in excessive irreversibility.

In summary, the prior art has not demonstrated a material that has all or most of the properties desired for use as an anode active material in a lithium-ion battery. Thus, there is an urgent and continuing need for a new anode active material that enables a lithium-ion battery to exhibit a high cycle life, high reversible capacity, low irreversible capacity, small particle sizes (for high-rate capacity), and compatibility with commonly used electrolytes. There is also a need for a method of readily or easily producing such a material in large quantities.

Thus, it is a specific object of the present disclosure to meet these needs and address the issues associated the rapid capacity decay of a lithium battery containing a high-capacity anode active material.

SUMMARY OF THE INVENTION

Herein reported is an anode active material layer for a lithium battery that contains a very unique class of anode active materials: sulfonated elastomer-encapsulated particles of an anode active material that is capable of overcoming the rapid capacity decay problem commonly associated with a lithium-ion battery that features a high-capacity anode active material, such as Si, Sn, and $SnO_2$.

The anode active material layer comprises multiple particulates of an anode active material, wherein a particulate is composed of one or a plurality of particles of an anode active material being encapsulated by a thin layer of sulfonated elastomeric material that has a fully recoverable tensile strain from 2% to 1,000% (preferably and more typically from 5% to 800%), a lithium ion conductivity no less than $10^{-7}$ S/cm at room temperature (preferably and typically no less than $10^{-6}$ S/cm, further preferably no less than $10^{-5}$ S/cm, more preferably no less than $10^{-4}$ S/cm, and most preferably no less than $10^{-3}$ S/cm; typically no greater than $5 \times 10^{-2}$ S/cm) and an encapsulating shell thickness from 1 nm to 10 μm (preferably from 1 nm to 1 μm and more preferably from 1 nm to 100 nm). Preferably, the anode active material contains a high-capacity anode active material having a specific capacity of lithium storage greater than 372 mAh/g, which is the theoretical capacity of graphite. These multiple particulates are available in a form of solid powder mass prior to being incorporated into an anode electrode (e.g. prior to being bonded by a resin binder).

In certain embodiments, the sulfonated elastomeric material contains a material selected from sulfonated natural polyisoprene, sulfonated synthetic polyisoprene, sulfonated polybutadiene, sulfonated chloroprene rubber, sulfonated polychloroprene, sulfonated butyl rubber, sulfonated styrene-butadiene rubber, sulfonated nitrile rubber, sulfonated ethylene propylene rubber, sulfonated ethylene propylene diene rubber, sulfonated metallocene-based poly(ethylene-co-octene) (POE) elastomer, sulfonated poly(ethylene-co-butene) (PBE) elastomer, sulfonated styrene-ethylene-butadiene-styrene (SEBS) elastomer, sulfonated epichlorohydrin rubber, sulfonated polyacrylic rubber, sulfonated silicone rubber, sulfonated fluorosilicone rubber, sulfonated perfluoroelastomers, sulfonated polyether block amides, sulfonated chlorosulfonated polyethylene, sulfonated ethylene-vinyl acetate polymer, sulfonated thermoplastic elastomer, sulfonated protein resilin, sulfonated protein elastin, sulfonated ethylene oxide-epichlorohydrin copolymer, sulfonated polyurethane, sulfonated urethane-urea copolymer, or a combination thereof.

In this anode active layer, the anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof, (g) particles of Li, Li alloy, or surface-stabilized Li having at least 60% by weight of lithium element therein; and (h) combinations thereof.

In some preferred embodiments, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

It may be noted that prelithiation of an anode active material means that this material has been pre-intercalated by or doped with lithium ions up to a weight fraction from 0.1% to 54.7% of Li in the lithiated product.

The anode active material is preferably in a form of nanoparticle (spherical, ellipsoidal, and irregular shape), nanowire, nanofiber, nanotube, nanosheet, nanobelt, nanoribbon, nanodisc, nanoplatelet, or nanohorn having a thickness or diameter less than 100 nm. These shapes can be collectively referred to as "particles" unless otherwise specified or unless a specific type among the above species is desired. Further preferably, the anode active material has a dimension less than 50 nm, even more preferably less than 20 nm, and most preferably less than 10 nm.

In some embodiments, one particle or a cluster of particles may be coated with or embraced by a layer of carbon disposed between the particle(s) and the sulfonated elastomeric material layer (the encapsulating shell). Alternatively or additionally, a carbon layer may be deposited to embrace the encapsulated particle or the encapsulated cluster of multiple anode active material particles.

The particulate may further contain a graphite or carbon material mixed with the active material particles and disposed inside the encapsulating shell (the thin sulfonated elastomer layer). The carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

The anode active material particles, prior to being embraced by the sulfonated elastomer shell, may be coated with or embraced by a conductive protective coating, selected from a carbon material, electronically conductive polymer, conductive metal oxide, or conductive metal coating. Preferably, the anode active material, in the form of a nanoparticle, nanowire, nanofiber, nanotube, nanosheet, nanobelt, nanoribbon, nanodisc, nanoplatelet, or nanohorn is pre-intercalated or pre-doped with lithium ions to form a prelithiated anode active material having an amount of lithium from 0.1% to 54.7% by weight of said prelithiated anode active material.

Preferably and typically, the sulfonated elastomeric material has a lithium ion conductivity no less than $10^{-6}$ S/cm, more preferably no less than $5\times10^{-5}$ S/cm. In some embodiments, the sulfonated elastomeric material is a neat polymer containing no additive or filler dispersed therein. In others, the sulfonated elastomeric material is an elastomer matrix composite containing from 0.1% to 50% by weight (preferably from 1% to 35% by weight) of a lithium ion-conducting additive dispersed in a sulfonated elastomer matrix material.

In some embodiments, the elastomeric material contains a material selected from sulfonated versions of the following elastomers: natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

In some embodiments, the sulfonated elastomeric material is an elastomer matrix composite containing a lithium ion-conducting additive dispersed in a sulfonated elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In some embodiments, the sulfonated elastomeric material is an elastomer matrix composite containing a lithium ion-conducting additive dispersed in a sulfonated elastomer matrix material, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate, ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, or a combination thereof.

The sulfonated elastomeric material may contain a mixture or blend of a sulfonated elastomer and an electron-conducting polymer selected from polyaniline, polypyrrole, polythiophene, polyfuran, a bi-cyclic polymer, derivatives thereof (e.g. sulfonated versions), or a combination thereof.

In some embodiments, the sulfonated elastomeric material contains a mixture or blend of a sulfonated elastomer and a lithium ion-conducting polymer selected from poly (ethylene oxide) (PEO), polypropylene oxide (PPO), poly (acrylonitrile) (PAN), poly(methyl methacrylate) (PMMA), poly(vinylidene fluoride) (PVDF), poly bis-methoxy ethoxyethoxide-phosphazenes, polyvinyl chloride, polydimethylsiloxane, poly(vinylidene fluoride)-hexafluoropropylene (PVDF-HFP), a sulfonated derivative thereof, or a combination thereof. Sulfonation is herein found to impart improved lithium ion conductivity to this group of non-elastomeric polymers.

The present disclosure also provides a powder mass of an anode active material for a lithium battery, said powder mass comprising multiple particulates wherein at least a particulate is composed of one or a plurality of particles of a high-capacity anode active material being encapsulated by a thin layer of sulfonated elastomeric material that has a lithium ion conductivity no less than $10^{-7}$ S/cm at room temperature and an encapsulating sulfonated elastomer shell thickness from 1 nm to 10 μm, and wherein the high-capacity anode active material has a specific capacity of lithium storage greater than 372 mAh/g. The powder mass may further comprise graphite particles, carbon particles, mesophase microbeads, carbon or graphite fibers, carbon nanotubes, graphene sheets, or a combination thereof. Preferably, the high-capacity anode is prelithiated.

The present disclosure also provides an anode electrode that contains the presently disclosed sulfonated elastomer-encapsulated high-capacity anode material particles, an optional conductive additive (e.g. expanded graphite flakes, carbon black, acetylene black, or carbon nanotube), an optional resin binder (typically required), and, optionally, some amount of the common anode active materials (e.g. particles of natural graphite, synthetic graphite, hard carbon, etc.).

The present disclosure also provides a lithium battery containing an optional anode current collector, the presently disclosed anode active material layer as described above, a cathode active material layer, an optional cathode current collector, an electrolyte in ionic contact with the anode active material layer and the cathode active material layer and an optional porous separator. The lithium battery may be a lithium-ion battery, lithium metal battery (containing lithium metal or lithium alloy as the main anode active material and containing no intercalation-based anode active material), lithium-sulfur battery, lithium-selenium battery, or lithium-air battery.

The disclosure also provides a method of producing a powder mass of an anode active material for a lithium battery, said method comprising: (a) providing a solution containing a sulfonated elastomer dissolved in a solvent or an precursor (monomer or oligomer) to the sulfonated elastomer in a liquid form or dissolved in a solvent; (b) dispersing a plurality of particles of an anode active material in the solution to form a slurry; and (c) dispensing the slurry and removing the solvent and/or polymerizing/curing the precursor to form the powder mass, wherein the powder mass comprises multiple particulates wherein at least a particulate is composed of one or a plurality of particles of an anode active material being encapsulated by a thin layer of sulfonated elastomer having a thickness from 1 nm to 10 μm, a fully recoverable tensile strain from 2% to 800%, and a lithium ion conductivity from $10^{-7}$ S/cm to $5 \times 10^{-2}$ S/cm at room temperature.

In this method, the sulfonated elastomer may contain a material selected from sulfonated natural polyisoprene, sulfonated synthetic polyisoprene, sulfonated polybutadiene, sulfonated chloroprene rubber, sulfonated polychloroprene, sulfonated butyl rubber, sulfonated styrene-butadiene rubber, sulfonated nitrile rubber, sulfonated ethylene propylene rubber, sulfonated ethylene propylene diene rubber, sulfonated metallocene-based poly(ethylene-co-octene) elastomer, sulfonated poly(ethylene-co-butene) elastomer, sulfonated styrene-ethylene-butadiene-styrene elastomer, sulfonated epichlorohydrin rubber, sulfonated polyacrylic rubber, sulfonated silicone rubber, sulfonated fluorosilicone rubber, sulfonated perfluoroelastomers, sulfonated polyether block amides, sulfonated chlorosulfonated polyethylene, sulfonated ethylene-vinyl acetate polymer, sulfonated thermoplastic elastomer, sulfonated protein resilin, sulfonated protein elastin, sulfonated ethylene oxide-epichlorohydrin copolymer, sulfonated polyurethane, sulfonated urethane-urea copolymer, or a combination thereof.

In this method, the step of dispensing the slurry and removing the solvent and/or polymerizing/curing the precursor to form the powder mass may include operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

The step of providing said solution may include (a) sulfonating an elastomer to form said sulfonated elastomer and dissolving said sulfonated elastomer in said solvent to form said solution, or (b) sulfonating said precursor to obtain a sulfonated precursor (sulfonated monomer or sulfonated oligomer), polymerizing said sulfonated precursor to form said sulfonated elastomer and dissolving said sulfonated elastomer in said solvent to form said solution.

In this method, the anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof. The Li alloy preferably contains from 0.1% to 10% by weight of a metal element selected from Zn, Ag, Au, Mg, Ni, Ti, Fe, Co, V, or a combination.

In this method, the anode active material may contain a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2. The method anode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm. In certain embodiments, one or a plurality of the anode active material particles is coated with a layer of carbon prior to step (b).

In this method, the slurry may further contain a graphite or carbon material selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

In this method, step (a) may further include dissolving or dispersing from 0.1% to 40% by weight of a lithium ion-conducting additive in the solution. The lithium ion-conducting additive may be selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4. Alternatively or additionally, the lithium ion-conducting additive may contain a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate, ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoro-ethysulfonylimide (LiBETI), lithium bis(trifluoromethanesulphonyl)imide, lithium bis(fluorosulphonyl) imide, lithium trifluoromethanesulfonimide (LiTFSI), an ionic liquid-based lithium salt, or a combination thereof.

The slurry further contains an electron-conducting polymer selected from polyaniline, polypyrrole, polythiophene, polyfuran, a bi-cyclic polymer, a sulfonated derivative thereof, or a combination thereof. Alternatively or additionally, the slurry may further contain a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazenes, polyvinyl chloride, polydimethylsiloxane, poly(vinylidene fluoride)-hexafluoropropylene (PVDF-HFP), a sulfonated derivative thereof, or a combination thereof.

In the method, the anode active material is preferably prelithiated to contains from 0.1% to 54.7% by weight of lithium prior to step (b).

In certain embodiments, the sulfonated elastomer is obtained by exposing an elastomer to a treatment selected from (i) exposure to sulfur trioxide in vapor phase or in solution, optionally in presence of Lewis bases such as triethyl phosphate, tetrahydrofuran, dioxane, or amines; (ii) exposure to chlorosulfonic acid in diethyl ether; (iii) exposure to concentrated sulfuric acid or a mixture of sulfuric acid with alkyl hypochlorite; (iv) exposure to a bisulfite combined to dioxygen, hydrogen peroxide, metallic catalysts, or peroxo derivates; (v) exposure to acetyl sulfate; or a combination thereof.

The disclosure also provides a method of producing a sulfonated powder mass of an anode active material for a lithium battery, the method comprising: (A) providing a solution containing an elastomer dissolved in a solvent or an precursor (monomer or oligomer) to the elastomer in a liquid form or dissolved in a solvent; (B) dispersing a plurality of particles of an anode active material in the solution to form a slurry; (C) dispensing the slurry and removing the solvent and/or polymerizing/curing the precursor to form a powder mass, wherein the powder mass comprises multiple particulates wherein at least a particulate is composed of one or a plurality of particles of an anode active material being encapsulated by a thin layer of elastomer having a thickness from 1 nm to 10 μm; and (D) sulfonating this thin layer of elastomer by exposing the powder mass to a sulfonating agent to form the sulfonated powder mass containing sulfonated elastomer-encapsulated particles, wherein sulfonated elastomer has a fully recoverable tensile strain from 2% to 800%, and a lithium ion conductivity from $10^{-7}$ S/cm to $5 \times 10^{-2}$ S/cm at room temperature.

The sulfonating agent is selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.).

The method may further comprise mixing multiple particulates of the anode active material, a binder resin, and an optional conductive additive to form an anode active material layer, which is optionally coated on an anode current collector (e.g. Cu foil, stainless steel foil, Ti foil, etc.). The method may further comprise combining the anode active material layer, a cathode layer, an electrolyte, and an optional porous separator into a lithium battery cell.

DESCRIPTION OF THE PREFERRED EMBODIMENTS

This disclosure is directed at the anode active material layer (negative electrode layer, not including the anode current collector) containing a high-capacity anode material for a lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present disclosure is not limited to any battery shape or configuration. For convenience, we will primarily use Si, Sn, and $SnO_2$ as illustrative examples of a high-capacity anode active material. This should not be construed as limiting the scope of the disclosure.

Figure 1A:
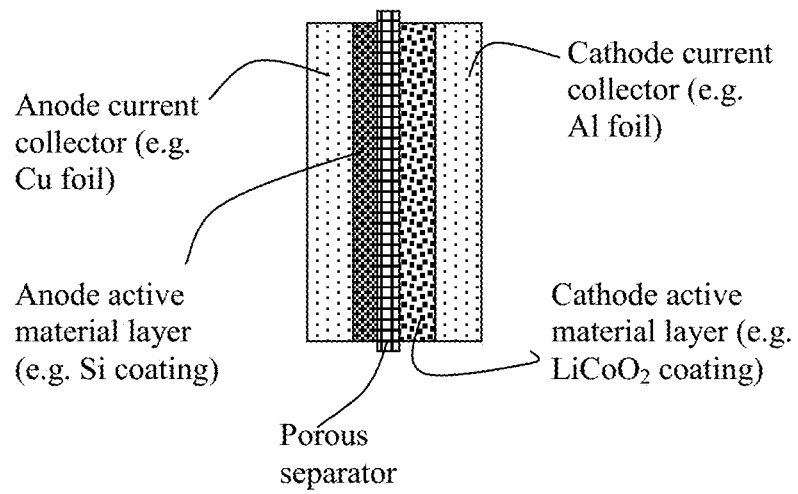
FIG. 1(A) Schematic of a prior art lithium-ion battery cell, wherein the anode layer is a thin coating of an anode active material itself.
Figure 1B:
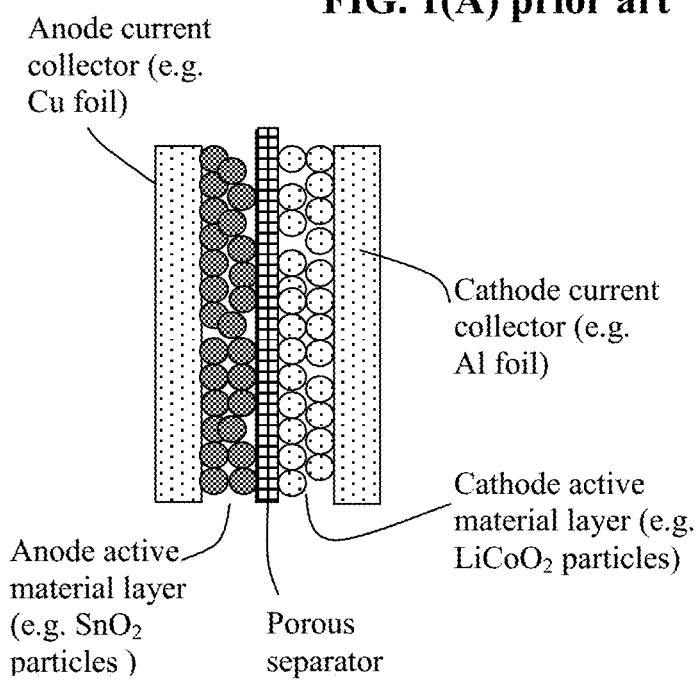
FIG. 1(B) Schematic of another prior art lithium-ion battery; the anode layer being composed of particles of an anode active material, a conductive additive (not shown) and a resin binder (not shown).

As illustrated in FIG. 1(B), a lithium-ion battery cell is typically composed of an anode current collector (e.g. Cu foil), an anode or negative electrode active material layer (i.e. anode layer typically containing particles of an anode active material, conductive additive, and binder), a porous separator and/or an electrolyte component, a cathode or positive electrode active material layer (containing a cathode active material, conductive additive, and resin binder), and a cathode current collector (e.g. Al foil). More specifically, the anode layer is composed of particles of an anode active material (e.g. graphite, Sn, $SnO_2$, or Si), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

In a less commonly used cell configuration, as illustrated in FIG. 1(A), the anode active material is deposited in a thin film form directly onto an anode current collector, such as a sheet of copper foil. This is not commonly used in the battery industry and, hence, will not be discussed further.

Figure 2A:
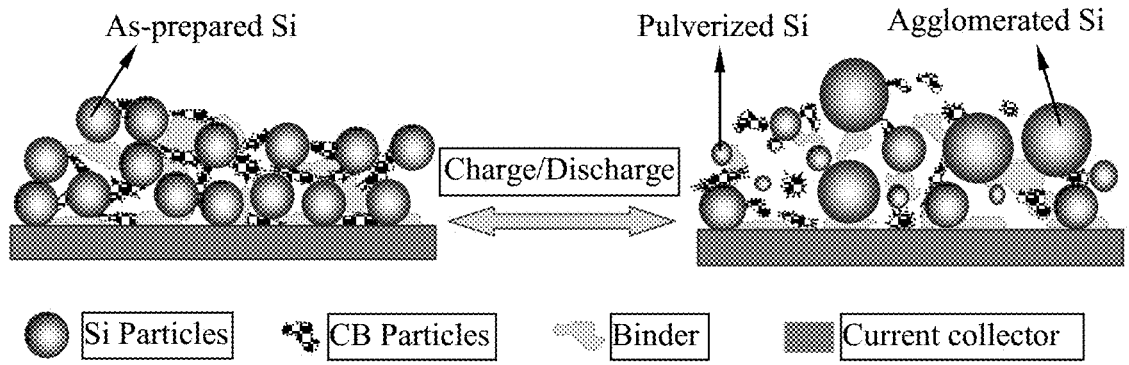
FIG. 2(A) Schematic illustrating the notion that expansion of Si particles, upon lithium intercalation during charging of a prior art lithium-ion battery, can lead to pulverization of Si particles, interruption of the conductive paths formed by the conductive additive, and loss of contact with the current collector.

In order to obtain a higher energy density cell, the anode in FIG. 1(B) can be designed to contain higher-capacity anode active materials having a composition formula of $Li_aA$ (A is a metal or semiconductor element, such as Al and Si, and "a" satisfies 0<a≤5). These materials are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as discussed in the Background section, there are several problems associated with the implementation of these high-capacity anode active materials:

1) As schematically illustrated in FIG. 2(A), in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. These adverse effects result in a significantly shortened charge-discharge cycle life.

2) The approach of using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles, has failed to overcome the capacity decay problem. Presumably, the protective matrix provides a cushioning effect for particle expansion or shrinkage, and prevents the electrolyte from contacting and reacting with the electrode active material. Unfortunately, when an active material particle, such as Si particle, expands (e.g. up to a volume expansion of 380%) during the battery charge step, the protective coating is easily broken due to the mechanical weakness and/o brittleness of the protective coating materials. There has been no high-strength and high-toughness material available that is itself also lithium ion conductive.

3) The approach of using a core-shell structure (e.g. Si nanoparticle encapsulated in a carbon or $SiO_2$ shell) also has not solved the capacity decay issue. As illustrated in upper portion of FIG. 2(B), a non-lithiated Si particle can be encapsulated by a carbon shell to form a core-shell structure (Si core and carbon or $SiO_2$ shell in this example). As the lithium-ion battery is charged, the anode active material (carbon- or $SiO_2$-encapsulated Si particle) is intercalated with lithium ions and, hence, the Si particle expands. Due to the brittleness of the encapsulating shell (carbon), the shell is broken into segments, exposing the underlying Si to electrolyte and subjecting the Si to undesirable reactions with electrolyte during repeated charges/discharges of the battery. These reactions continue to consume the electrolyte and reduce the cell's ability to store lithium ions.

Figure 2B:
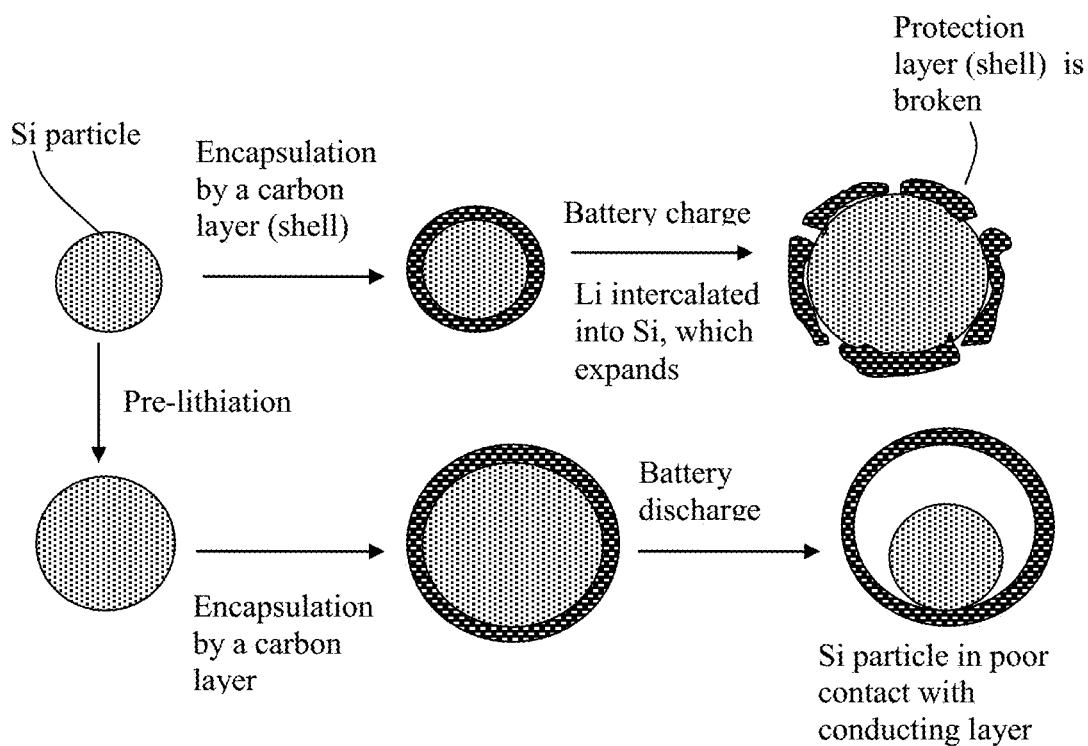
FIG. 2(B) illustrates the issues associated with prior art anode active material; for instance, a non-lithiated Si particle encapsulated by a protective shell (e.g. carbon shell) in a core-shell structure inevitably leads to breakage of the shell and that a prelithiated Si particle encapsulated with a protective layer leads to poor contact between the contracted Si particle and the rigid protective shell during battery discharge.

4) Referring to the lower portion of FIG. 2(B), wherein the Si particle has been prelithiated with lithium ions; i.e. has been pre-expanded in volume. When a layer of carbon (as an example of a protective material) is encapsulated around the prelithiated Si particle, another core-shell structure is formed. However, when the battery is discharged and lithium ions are released (de-intercalated) from the Si particle, the Si particle contracts, leaving behind a large gap between the protective shell and the Si particle. Such a configuration is not conducive to lithium intercalation of the Si particle during the subsequent battery charge cycle due to the gap and the poor contact of Si particle with the protective shell (through which lithium ions can diffuse). This would significantly curtail the lithium storage capacity of the Si particle particularly under high charge rate conditions.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the elastomer-protected anode active material.

The present disclosure provides an anode active material layer comprising multiple particulates of an anode active material, wherein a particulate is composed of one or a plurality of particles of a high-capacity anode active material being encapsulated by a thin layer of sulfonated elastomeric material that has a lithium ion conductivity no less than $10^{-7}$ S/cm at room temperature (preferably and typically no less than $10^{-6}$ S/cm, further preferably no less than $10^{-5}$ S/cm, more preferably no less than $10^{-4}$ S/cm, and most preferably no less than $10^{-3}$ S/cm; typically no greater than $5 \times 10^{-2}$ S/cm) and an encapsulating shell thickness from 1 nm to 10 μm, and wherein said high-capacity anode active material has a specific capacity of lithium storage greater than 372 mAh/g (which is the theoretical capacity of graphite).

Figure 4:
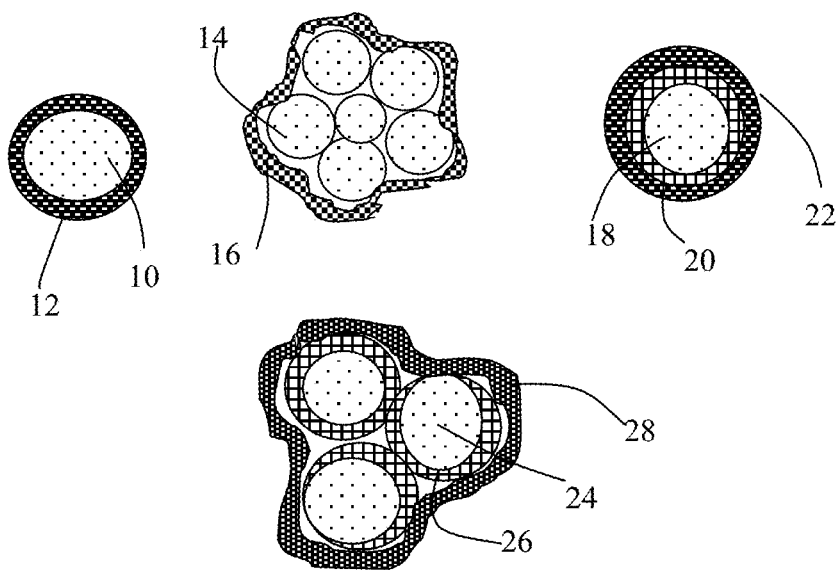
FIG. 4 Schematic of four types of sulfonated elastomer-embraced anode active material particles.

As illustrated in FIG. 4, the present disclosure provides four major types of particulates of sulfonated elastomer-encapsulated anode active material particles. The first one is a single-particle particulate containing an anode active material core 10 encapsulated by a sulfonated elastomer shell 12. The second is a multiple-particle particulate containing multiple anode active material particles 14 (e.g. Si nanoparticles), optionally along with other active materials (e.g. particles of graphite or hard carbon, not shown) or conductive additive, which are encapsulated by a sulfonated elastomer shell 16. The third is a single-particle particulate containing an anode active material core 18 coated by a carbon layer 20 (or other conductive material) further encapsulated by an elastomer shell 22. The fourth is a multiple-particle particulate containing multiple anode active material particles 24 (e.g. Si nanoparticles) coated with a conductive protection layer 26, optionally along with other active materials (e.g. particles of graphite or hard carbon, not shown) or conductive additive, which are encapsulated by a sulfonated elastomer shell 28. These anode active material particles can be prelithiated or non-prelithiated.

Figure 3:
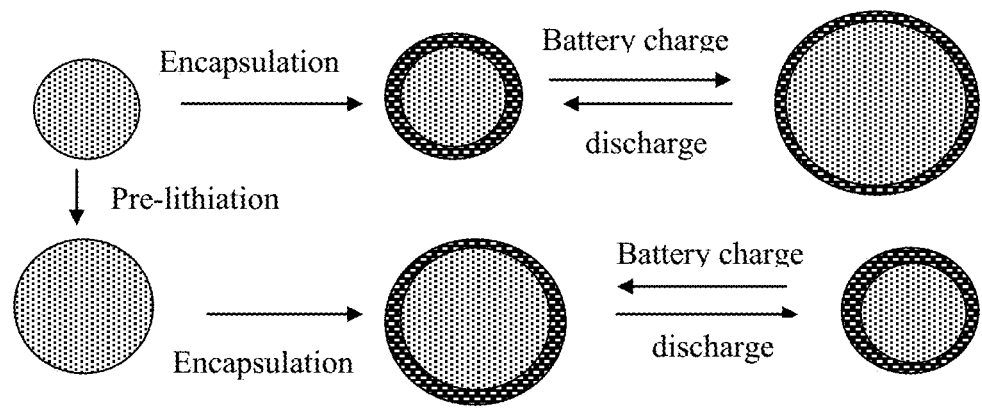
FIG. 3 Schematic of the presently disclosed sulfonated elastomer-encapsulated anode active material particles (prelithiated or unlithiated). The elasticity of the elastomeric shell enables the shell to expand and contract congruently and conformingly with core particle.

As schematically illustrated in the upper portion of FIG. 3, a non-lithiated Si particle can be encapsulated by a sulfonated elastomeric shell to form a core-shell structure (Si core and elastomer shell in this example). As the lithium-ion battery is charged, the anode active material (sulfonated elastomer-encapsulated Si particle) is intercalated with lithium ions and, hence, the Si particle expands. Due to the high elasticity of the encapsulating shell (sulfonated elastomer), the shell will not be broken into segments (in contrast to the broken carbon shell). That the sulfonated elastomer shell remains intact prevents the exposure of the underlying Si to electrolyte and, thus, prevents the Si from undergoing undesirable reactions with electrolyte during repeated charges/discharges of the battery. This strategy prevents continued consumption of the electrolyte to form additional SEI.

Alternatively, referring to the lower portion of FIG. 3, wherein the Si particle has been prelithiated with lithium ions; i.e. has been pre-expanded in volume. When a layer of sulfonated elastomer is encapsulated around the prelithiated Si particle, another core-shell structure is formed. When the battery is discharged and lithium ions are released (de-intercalated) from the Si particle, the Si particle contracts. However, the elastomer is capable of elastically shrinking in a conformal manner; hence, leaving behind no gap between the protective shell and the Si particle. Such a configuration is amenable to subsequent lithium intercalation and de-intercalation of the Si particle. The sulfonated elastomer shell expands and shrinks congruently with the expansion and shrinkage of the encapsulated core anode active material particle, enabling long-term cycling stability of a lithium battery featuring a high-capacity anode active material (such as Si, Sn, $SnO_2$, $Co_3O_4$, etc.).

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. Particles of Li or Li alloy (Li alloy containing from 0.1% to 10% by weight of Zn, Ag, Au, Mg, Ni, Ti, Fe, Co, or V element), particularly surface-stabilized Li particles (e.g. wax-coated Li particles), were found to be good anode active material per se or an extra lithium source to compensate for the loss of Li ions that are otherwise supplied only from the cathode active material. The presence of these Li or Li-alloy particles encapsulated inside an elastomeric shell was found to significantly improve the cycling performance of a lithium cell.

Prelithiation of an anode active material can be conducted by several methods (chemical intercalation, ion implementation, and electrochemical intercalation). Among these, the electrochemical intercalation is the most effective. Lithium ions can be intercalated into non-Li elements (e.g. Si, Ge, and Sn) and compounds (e.g. $SnO_2$ and $Co_3O_4$) up to a weight percentage of 54.68% (see Table 1 below). For Zn, Mg, Ag, and Au encapsulated inside an elastomer shell, the amount of Li can reach 99% by weight.

TABLE 1

Lithium storage capacity of selected non-Li elements.

| Intercalated compound | Atomic weight of Li, g/mole | Atomic weight of active material, g/mole | Max. wt. % of Li |
| --- | --- | --- | --- |
| $Li_4Si$ | 6.941 | 28.086 | 49.71 |
| $Li_{4.4}Si$ | 6.941 | 28.086 | 54.68 |
| $Li_{4.4}Ge$ | 6.941 | 72.61 | 30.43 |
| Li4.4Sn | 6.941 | 118.71 | 20.85 |
| $Li_3Cd$ | 6.941 | 112.411 | 14.86 |
| $Li_3Sb$ | 6.941 | 121.76 | 13.93 |
| $Li_{4.4}Pb$ | 6.941 | 207.2 | 13.00 |
| LiZn | 6.941 | 65.39 | 7.45 |
| $Li_3Bi$ | 6.941 | 208.98 | 8.80 |

The particles of the anode active material may be in the form of a nanoparticle, nanowire, nanofiber, nanotube, nanosheet, nanoplatelet, nanodisc, nanobelt, nanoribbon, or nanohorn. They can be non-lithiated (when incorporated into the anode active material layer) or prelithiated to a desired extent (up to the maximum capacity as allowed for a specific element or compound.

Preferably and typically, the sulfonated elastomer material has a lithium ion conductivity no less than $10^{-7}$ S/cm, more preferably and typically no less than $10^{-5}$ S/cm, further preferably no less than $10^{-4}$ S/cm, and most preferably no less than $10^{-3}$ S/cm. In some embodiments, the sulfonated elastomeric material further contains from 0.1% to 50% (preferably 1% to 35%) by weight of a lithium ion-conducting additive dispersed in a sulfonated elastomer matrix material.

The elastomeric material must have a high elasticity (high tensile elastic deformation value, at least >2%, more desirably >10%). An elastic deformation is a deformation that is fully recoverable and the recovery process is essentially instantaneous (no significant time delay). An elastomer, such as a vulcanized natural rubber, can exhibit an elastic deformation from 2% up to 1,000% (10 times of its original length), more typically from 10% to 800%, and further more typically from 50% to 500%, and most typically and desirably from 100% to 500%. It may be noted that although a metal typically has a high ductility (i.e. can be extended to a large extent without breakage), the majority of the tensile deformation is plastic deformation (non-recoverable) and only a small amount of elastic deformation (typically <1% and more typically <0.2%).

A broad array of sulfonated elastomers, as a neat resin alone or as a matrix material for an elastomeric matrix composite, can be used to encapsulate an anode active material particle or multiple particles. Encapsulation means substantially fully embracing the particle(s) without allowing the particle to be in direct contact with electrolyte in the battery. The sulfonated elastomeric material may be selected from the sulfonated versions of natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), EPM (ethylene propylene rubber, a copolymer of ethylene and propylene), EPDM rubber (ethylene propylene diene rubber, a terpolymer of ethylene, propylene and a diene-component), metallocene-based poly(ethylene-co-octene) (POE) elastomer, poly(ethylene-co-butene) (PBE) elastomer, styrene-ethylene-butadiene-styrene (SEBS) elastomer, epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, protein elastin, ethylene oxide-epichlorohydrin copolymer, polyurethane, urethane-urea copolymer, and combinations thereof.

The urethane-urea copolymer film usually consists of two types of domains, soft domains and hard ones. Entangled linear backbone chains consisting of poly(tetramethylene ether) glycol (PTMEG) units constitute the soft domains, while repeated methylene diphenyl diisocyanate (MDI) and ethylene diamine (EDA) units constitute the hard domains. The lithium ion-conducting additive can be incorporated in the soft domains or other more amorphous zones.

In some embodiments, the sulfonated elastomeric material is an elastomer matrix composite containing a lithium ion-conducting additive dispersed in a sulfonated elastomer matrix material, wherein the lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, x=0-1, y=1-4.

In some embodiments, the sulfonated elastomeric material is an elastomer matrix composite containing a lithium ion-conducting additive dispersed in a sulfonated elastomer matrix material, wherein the lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate, ($LiCF_3SO_3$), bis-trifluoromethyl sulfonylimide lithium ($LiN(CF_3SO_2)_2$), lithium bis (oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, or a combination thereof.

The sulfonated elastomeric material may contain a mixture or blend of a sulfonated elastomer and an electron-conducting polymer selected from polyaniline, polypyrrole, polythiophene, polyfuran, a bi-cyclic polymer, derivatives thereof (e.g. sulfonated conducting polymers), or a combination thereof.

In some embodiments, the sulfonated elastomeric material contains a mixture or blend of a sulfonated elastomer and a lithium ion-conducting polymer selected from poly (ethylene oxide) (PEO), polypropylene oxide (PPO), poly (acrylonitrile) (PAN), poly(methyl methacrylate) (PMMA), poly(vinylidene fluoride) (PVDF), poly bis-methoxy ethoxyethoxide-phosphazenes, polyvinyl chloride, polydimethylsiloxane, poly(vinylidene fluoride)-hexafluoropropylene (PVDF-HFP), a derivative thereof (e.g. a sulfonated version), or a combination thereof.

Some elastomers are originally in an unsaturated chemical state (unsaturated rubbers) that can be cured by sulfur vulcanization to form a cross-linked polymer that is highly elastic (hence, an elastomer). Prior to vulcanization, these polymers or oligomers are soluble in an organic solvent to form a polymer solution. Particles of an anode active material (e.g. $SnO_2$ nanoparticles and Si nanowires) can be dispersed in this polymer solution to form a suspension (dispersion or slurry) of an active material particle-polymer mixture. This suspension can then be subjected to a solvent removal treatment while individual particles remain substantially separated from one another. The polymer precipitates out to deposit on surfaces of these active material particles. This can be accomplished, for instance, via spray drying.

Unsaturated rubbers that can be vulcanized to become elastomer include natural polyisoprene (e.g. cis-1,4-polyisoprene natural rubber (NR) and trans-1,4-polyisoprene gutta-percha), synthetic polyisoprene (IR for isoprene rubber), polybutadiene (BR for butadiene rubber), chloroprene rubber (CR), polychloroprene (e.g. Neoprene, Baypren etc.), butyl rubber (copolymer of isobutylene and isoprene, IIR), including halogenated butyl rubbers (chloro butyl rubber (CIIR) and bromo butyl rubber (BIIR), styrene-butadiene rubber (copolymer of styrene and butadiene, SBR), nitrile rubber (copolymer of butadiene and acrylonitrile, NBR), Some elastomers are saturated rubbers that cannot be cured by sulfur vulcanization; they are made into a rubbery or elastomeric material via different means: e.g. by having a copolymer domain that holds other linear chains together. Each of these elastomers can be used to encapsulate particles of an anode active material by one of several means: melt mixing (followed by pelletizing and ball-milling, for instance), solution mixing (dissolving the anode active material particles in an uncured polymer, monomer, or oligomer, with or without an organic solvent) followed by drying (e.g. spray drying), interfacial polymerization, or in situ polymerization of elastomer in the presence of anode active material particles.

Saturated rubbers and related elastomers in this category include EPM (ethylene propylene rubber, a copolymer of ethylene and propylene), EPDM rubber (ethylene propylene diene rubber, a terpolymer of ethylene, propylene and a diene-component), epichlorohydrin rubber (ECO), polyacrylic rubber (ACM, ABR), silicone rubber (SI, Q, VMQ), fluorosilicone rubber (FVMQ), fluoroelastomers (FKM, and FEPM; such as Viton, Tecnoflon, Fluorel, Aflas and Dai-El), perfluoroelastomers (FFKM: Tecnoflon PFR, Kalrez, Chemraz, Perlast), polyether block amides (PEBA), chlorosulfonated polyethylene (CSM; e.g. Hypalon), and ethylene-vinyl acetate (EVA), thermoplastic elastomers (TPE), protein resilin, and protein elastin. Polyurethane and its copolymers (e.g. urea-urethane copolymer) are particularly useful elastomeric shell materials for encapsulating anode active material particles.

Several micro-encapsulation processes require the sulfonated elastomer materials to be dissolvable in a solvent. Fortunately, all the elastomers used herein are soluble in some common solvents. Even for those rubbers that are not very soluble after vulcanization, the un-cured polymer (prior to vulcanization or curing) can be readily dissolved in a common organic solvent to form a solution. This solution can then be used to encapsulate solid particles via several of the micro-encapsulation methods to be discussed in what follows. Upon encapsulation, the elastomer shell is then vulcanized or cured. Some examples of rubbers and their solvents are polybutadiene (2-methyl pentane+n-hexane or 2,3-dimethylbutane), styrene-butadiene rubber (toluene, benzene, etc.), butyl rubber (n-hexane, toluene, cyclohexane), etc. The SBR can be vulcanized with different amounts sulfur and accelerator at 160° C. order to obtain different network structures and crosslink densities. Butyl rubber (IIR) is a copolymer of isobutylene and a small amount of isoprene (e.g. about 98% polyisobutylene with 2% isoprene distributed randomly in the polymer chain). Elemental sulfur and organic accelerators (such as thiuram or thiocarbamates) can be used to cross-link butyl rubber to different extents as desired. Thermoplastic elastomers are also readily soluble in solvents.

There are three broad categories of micro-encapsulation methods that can be implemented to produce elastomer-encapsulated particles of an anode active material: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-Coating Method:

The pan coating process involves tumbling the active material particles in a pan or a similar device while the encapsulating material (e.g. sulfonated elastomer monomer/oligomer, sulfonated elastomer melt, sulfonated elastomer/solvent solution) is applied slowly until a desired encapsulating shell thickness is attained. Alternatively, pan-coating may be applied to forming un-sulfonated elastomer-encapsulated active material particles, followed by sulfonation of the encapsulating shell elastomer.

Air-Suspension Coating Method:

This method also can be conducted before or after the elastomer or its precursor is sulfonated. In the air suspension coating process, the solid particles (core material) are dispersed into the supporting air stream in an encapsulating chamber. A controlled stream of a polymer-solvent solution (elastomer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymers while the volatile solvent is removed, leaving a very thin layer of polymer (elastomer or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal Extrusion:

Anode active materials may be encapsulated using a rotating extrusion head containing concentric nozzles. In this process, a stream of core fluid (slurry containing particles of an anode active material dispersed in a solvent) is surrounded by a sheath of shell solution or melt. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational Nozzle Method:

Core-shell encapsulation or matrix-encapsulation of an anode active material can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material. The solidification can be done according to the used gelation system with an internal gelation (e.g. sol-gel processing, melt) or an external (additional binder system, e.g. in a slurry). This method also can be conducted before or after the elastomer or its precursor is sulfonated.

Spray-Drying:

Spray drying may be used to encapsulate particles of an active material when the active material is dissolved or suspended in a melt or polymer solution. In spray drying, the liquid feed (solution or suspension) is atomized to form droplets which, upon contacts with hot gas, allow solvent to get vaporized and thin polymer shell to fully embrace the solid particles of the active material. This method also can be conducted before or after the elastomer or its precursor is sulfonated.

Coacervation-Phase Separation:

This process consists of three steps carried out under continuous agitation:

(a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.

(b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and (c) Hardening of encapsulating shell material: shell material being immiscible in vehicle phase and made rigid via thermal, cross-linking, or dissolution techniques.

Interfacial Polycondensation and Interfacial Cross-Linking:

Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-Situ Polymerization:

In some micro-encapsulation processes, active materials particles are fully coated with a monomer or oligomer first. Then, direct polymerization of the monomer or oligomer is carried out on the surfaces of these material particles.

Matrix Polymerization:

This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

A variety of synthetic methods may be used to sulfonate an elastomer or rubber: (i) exposure to sulfur trioxide in vapor phase or in solution, possibly in presence of Lewis bases such as triethyl phosphate, tetrahydrofuran, dioxane, or amines; (ii) chlorosulfonic acid in diethyl ether; (iii) concentrated sulfuric acid or mixtures of sulfuric acid with alkyl hypochlorite; (iv) bisulfites combined to dioxygen, hydrogen peroxide, metallic catalysts, or peroxo derivates; and (v) acetyl sulfate.

Sulfonation of an elastomer or rubber may be conducted before, during, or after curing of the elastomer or rubber. Further, sulfonation of the elastomer or rubber may be conducted before or after the particles of an electrode active material are embraced or encapsulated by the elastomer/rubber or its precursor (monomer or oligomer). Sulfonation of an elastomer or rubber may be accomplished by exposing the elastomer/rubber to a sulfonation agent in a solution state or melt state, in a batch manner or in a continuous process. The sulfonating agent may be selected from sulfuric acid, sulfonic acid, sulfur trioxide, chlorosulfonic acid, a bisulfate, a sulfate (e.g. zinc sulfate, acetyl sulfate, etc.), a mixture thereof, or a mixture thereof with another chemical species (e.g. acetic anhydride, thiolacetic acid, or other types of acids, etc.). In addition to zinc sulfate, there are a wide variety of metal sulfates that may be used as a sulfonating agent; e.g. those sulfates containing Mg, Ca, Co, Li, Ba, Na, Pb, Ni, Fe, Mn, K, Hg, Cr, and other transition metals, etc.

For instance, a triblock copolymer, poly(styrene-isobutylene-styrene) or SIBS, may be sulfonated to several different levels ranging from 0.36 to 2.04 mequiv./g (13 to 82 mol % of styrene; styrene being 19 mol % of the unsulfonated block copolymer). Sulfonation of SIBS may be performed in solution with acetyl sulfate as the sulfonating agent. First, acetic anhydride reacts with sulfuric acid to form acetyl sulfate (a sulfonating agent) and acetic acid (a by-product). Then, excess water is removed since anhydrous conditions are required for sulfonation of SIBS. The SIBS is then mixed with the mixture of acetyl sulfate and acetic acid. Such a sulfonation reaction produces sulfonic acid substituted to the para-position of the aromatic ring in the styrene block of the polymer. Elastomers having an aromatic ring may be sulfonated in a similar manner.

A sulfonated elastomer also may be synthesized by copolymerization of a low level of functionalized (i.e. sulfonated) monomer with an unsaturated monomer (e.g. olefinic monomer, isoprene monomer or oligomer, butadiene monomer or oligomer, etc.).

Example 1: Sulfonation of Triblock Copolymer Poly(Styrene-Isobutylene-Styrene) or SIBS An example of the sulfonation procedure used in this study is summarized as follows: a 10% (w/v) solution of SIBS (50 g) in methylene chloride (500 ml) was prepared. The solution was stirred and refluxed at approximately 40 8 C, while a specified amount of acetyl sulfate in methylene chloride was slowly added to begin the sulfonation reaction. Acetyl sulfate in methylene chloride was prepared prior to this reaction by cooling 150 ml of methylene chloride in an ice bath for approximately 10 min. A specified amount of acetic anhydride and sulfuric acid was then added to the chilled methylene chloride under stirring conditions. Sulfuric acid was added approximately 10 min after the addition of acetic anhydride with acetic anhydride in excess of a 1:1 mole ratio. This solution was then allowed to return to room temperature before addition to the reaction vessel.

After approximately 5 h, the reaction was terminated by slowly adding 100 ml of methanol. The reacted polymer solution was then precipitated with deionized water. The precipitate was washed several times with water and methanol, separately, and then dried in a vacuum oven at 50 8 C for 24 h. This washing and drying procedure was repeated until the pH of the wash water was neutral. After this process, the final polymer yield was approximately 98% on average. This sulfonation procedure was repeated with different amounts of acetyl sulfate to produce several sulfonated polymers with various levels of sulfonation or ion-exchange capacities (IECs). The mol % sulfonation is defined as: mol %=(moles of sulfonic acid/moles of styrene)×100%, and the IEC is defined as the mille-equivalents of sulfonic acid per gram of polymer (mequiv./g).

After sulfonation and washing of each polymer, the S-SIBS samples were dissolved in a mixed solvent of toluene/hexanol (85/15, w/w) with concentrations ranging from 5 to 2.5% (w/v). Desired amounts of anode active material particles were then added into the solution to form slurry samples. The slurry samples were separately spray-dried to form sulfonated elastomer-embraced particles.

Example 2: Synthesis of Sulfonated Polybutadiene (PB) by Free Radical Addition of Thiolacetic Acid (TAA) Followed by In Situ Oxidation with Performic Acid A representative procedure is given as follows. PB (8.0 g) was dissolved in toluene (800 mL) under vigorous stirring for 72 h at room temperature in a 1 L round-bottom flask. Benzophenone (BZP) (0.225 g; 1.23 mmol; BZP/olefin molar ratio=1:120) and TAA (11.9 mL; 0.163 mol, TAA/olefin molar ratio=1.1) were introduced into the reactor, and the polymer solution was irradiated for 1 h at room temperature with UV light of 365 nm and power of 100 W. The resulting thioacetylated polybutadiene (PB-TA) was isolated by pouring 200 mL of the toluene solution in a plenty of methanol and the polymer recovered by filtration, washed with fresh methanol, and dried in vacuum at room temperature (Yield=3.54 g). Formic acid (117 mL; 3.06 mol; HCOOH/olefin molar ratio=25), along with a desired amount of anode active material particles, from 10 to 100 grams) were added to the toluene solution of PB-TA at 50° C. followed by slow addition of 52.6 mL of hydrogen peroxide (35 wt %; 0.61 mol; $H_2O_2$/olefin molar ratio=5) in 20 min. It may be noted that the reaction is autocatalytic and strongly exothermic. The resulting slurry was spray-dried to obtain sulfonated polybutadiene (PB-SA).

Example 3: Synthesis of Sulfonated SBS

Sulfonated styrene-butadiene-styrene triblock copolymer (SBS) based elastomer was directly synthesized. First, SBS is first epoxidized by performic acid formed in situ, followed by ring-opening reaction with an aqueous solution of $NaHSO_3$. In a typical procedure, epoxidation of SBS was carried out via reaction of SBS in cyclohexane solution (SBS concentration=11 g/100 mL) with performic acid formed in sit from HCOOH and 30% aqueous $H_2O_2$ solution at 70° C. for 4 h, using 1 wt % poly(ethylene glycol)/SBS as a phase transfer catalyst. The molar ratio of $H_2O_2$/HCOOH was 1. The product (ESBS) was precipitated and washed several times with ethanol, followed by drying in a vacuum dryer at 60° C.

Subsequently, ESBS was first dissolved in toluene to form a solution with a concentration of 10 g/100 mL, into which was added 5 wt % TEAB/ESBS as a phase transfer catalyst and 5 wt % DMA/ESBS as a ring-opening catalyst. Herein, TEAB=tetraethyl ammonium bromide and DMA=N,N-dimethyl aniline. An aqueous solution of $NaHSO_3$ and $Na_2SO_3$ was then added with vigorous stirring at 60° C. for 7 h at a molar ratio of $NaHSO_3$/epoxy group at 1.8 and a weight ratio of $Na_2SO_3$/$NaHSO_3$ at 36%. This reaction allows for opening of the epoxide ring and attaching of the sulfonate group according to the following reaction:

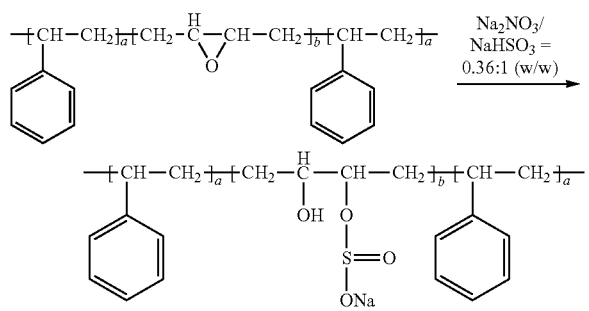

The reaction was terminated by adding a small amount of acetone solution containing antioxidant. The mixture was washed with distilled water three times, then precipitated by ethanol, followed by drying in a vacuum dryer at 50° C. It may be noted that particles of an electrode active material could be added during various stages of the aforementioned procedure (e.g. right from the beginning, or prior to the ring opening reaction).

Example 4: Synthesis of Sulfonated SBS by Free Radical Addition of Thiolacetic Acid (TAA) Followed by In Situ Oxidation with Performic Acid A representative procedure is given as follows. SBS (8.000 g) in toluene (800 mL) was left under vigorous stirring for 72 hours at room temperature and heated later on for 1 h at 65° C. in a 1 L round-bottom flask until the complete dissolution of the polymer. Thus, benzophenone (BZP, 0.173 g; 0.950 mmol; BZP/olefin molar ratio=1:132) and TAA (8.02 mL; 0.114 mol, TAA/olefin molar ratio=1.1) were added, and the polymer solution was irradiated for 4 h at room temperature with UV light of 365 nm and power of 100 W. To isolate a fraction of the thioacetylated sample (S(B-TA)S), 20 mL of the polymer solution was treated with plenty of methanol, and the polymer was recovered by filtration, washed with fresh methanol, and dried in vacuum at room temperature. The toluene solution containing the thioacetylated polymer was equilibrated at 50° C., and 107.4 mL of formic acid (2.84 mol; HCOOH/olefin molar ratio=27.5) and 48.9 mL of hydrogen peroxide (35 wt %; 0.57 mol; $H_2O_2$/olefin molar ratio=5.5) were added in about 15 min. It may be cautioned that the reaction is autocatalytic and strongly exothermic! Particles of the desired anode active materials were added before or after this reaction. The resulting slurry was stirred for 1 h, and then most of the solvent was distilled off in vacuum at 35° C. Finally, the slurry containing the sulfonated elastomer was coagulated in a plenty of acetonitrile, isolated by filtration, washed with fresh acetonitrile, and dried in vacuum at 35° C. to obtain sulfonated elastomers.

Other elastomers (e.g. polyisoprene, EPDM, EPR, polyurethane, etc.) were sulfonated in a similar manner. Alternatively, all the rubbers or elastomers can be directly immersed in a solution of sulfuric acid, a mixture of sulfuric acid and acetyl sulfate, or other sulfonating agent discussed above to produce sulfonated elastomers/rubbers.

Example 5: Cobalt Oxide ($Co_3O_4$) Anode Particulates

An appropriate amount of inorganic salts $Co(NO_3)_2 \cdot 6H_2O$ and ammonia solution ($NH_3 \cdot H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. Portion of the $Co_3O_4$ particles was then encapsulated with a sulfonated urea-urethane copolymer with the encapsulating elastomer shell thickness being varied from 17 nm to 135 nm.

For electrochemical testing, the working electrodes were prepared by mixing 85 wt. % active material (encapsulated or non-encapsulated particulates of $Co_3O_4$, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk (=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M LiPF$_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

The electrochemical performance of the particulates of sulfonated elastomer-encapsulated Co$_3$O$_4$ particles and that of non-protected Co$_3$O$_4$ were evaluated by galvanostatic charge/discharge cycling at a current density of 50 mA/g, using a LAND electrochemical workstation. The results indicate that the charge/discharge profiles for the encapsulated Co$_3$O$_4$ particles and un-protected Co$_3$O$_4$ particle-based electrodes show a long voltage plateau at about 1.06 V and 1.10 V, respectively, followed by a slopping curve down to the cut-off voltage of 0.01 V, indicative of typical characteristics of voltage trends for the Co$_3$O$_4$ electrode.

Figure 5:
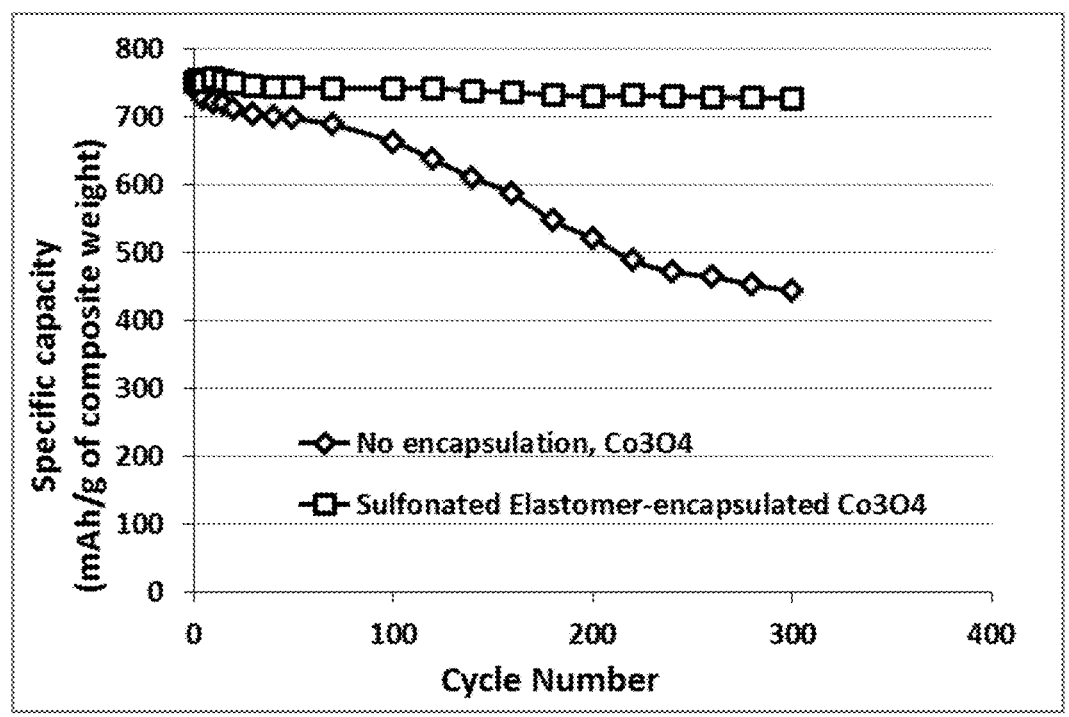
FIG. 5 The specific capacity of a lithium battery having an anode active material featuring sulfonated elastomer-encapsulated $Co_3O_4$ particles and that having un-protected $Co_3O_4$ particles.

As summarized in FIG. 5, the first-cycle lithium insertion capacity is 752 mAh/g (non-encapsulated) and 751 mAh/g (encapsulated), respectively, which are higher than the theoretical values of graphite (372 mAh/g). Both cells exhibit some first-cycle irreversibility. The initial capacity loss might have resulted from the incomplete conversion reaction and partially irreversible lithium loss due to the formation of solid electrolyte interface (SEI) layers.

As the number of cycles increases, the specific capacity of the bare Co$_3$O$_4$ electrode drops precipitously. Compared with its initial capacity value of approximately 752 mAh/g, its capacity suffers a 20% loss after 150 cycles and a 41% loss after 300 cycles. By contrast, the presently disclosed sulfonated elastomer-encapsulated particulates provide the battery cell with a very stable and high specific capacity for a large number of cycles, experiencing a capacity loss of less than 3.2% after 300 cycles. These data have clearly demonstrated the surprising and superior performance of the presently disclosed particulate electrode materials compared with prior art un-encapsulated particulate-based electrode materials.

We have also observed that sulfonation of an elastomer significantly increases the lithium-ion conductivity of the elastomer and, thereby, enable faster lithium ion transport and higher power density.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 150 cycles. In contrast, the cycle life of the presently disclosed cells (not just button cells, but large-scale full cells) is typically from 1,000 to 4,000.

Example 6: Sulfonated Elastomer-Encapsulated Tin Oxide Particulates

Tin oxide (SnO$_2$) nanoparticles were obtained by the controlled hydrolysis of SnCl$_4$.5H$_2$O with NaOH using the following procedure: SnCl$_4$.5H$_2$O (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 min. Subsequently, the resulting hydrosol was reacted with H$_2$SO$_4$. To this mixed solution, few drops of 0.1 M of H$_2$SO$_4$ were added to flocculate the product. The precipitated solid was collected by centrifugation, washed with water and ethanol, and dried in vacuum. The dried product was heat-treated at 400° C. for 2 h under Ar atmosphere. A dilute sulfonated elastomer-solvent solution (0.01-0.1 M of cis-polyisoprene in cyclohexane and 1,4-dioxane) was used as a coating solution in an air-suspension method to produce sulfonated elastomer-encapsulated SnO$_2$ particles having a shell thickness of 2.3 nm to 124 nm.

Figure 6:
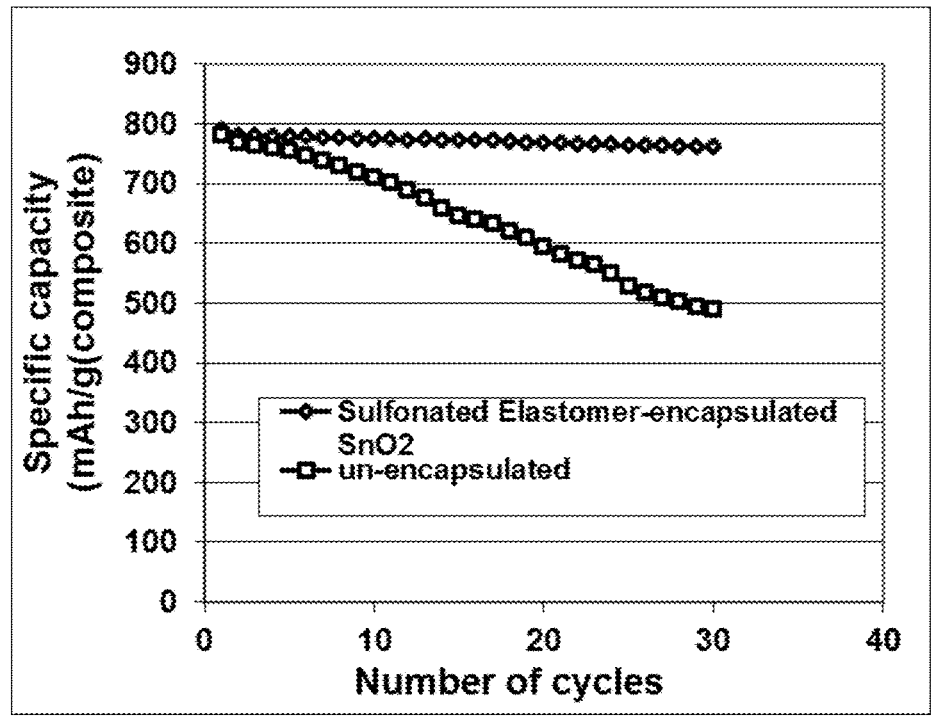
FIG. 6 The specific capacity of a lithium battery having an anode active material featuring sulfonated elastomer-encapsulated $SnO_2$ particles and that having un-protected $SnO_2$ particles.

The battery cells from the sulfonated elastomer-encapsulated particulates (nanoscaled SnO$_2$ particles) and non-coated SnO$_2$ particles were prepared using a procedure described in Example 5. FIG. 6 shows that the anode prepared according to the presently disclosed elastomer-encapsulated particulate approach offers a significantly more stable and higher reversible capacity compared to the un-coated SnO$_2$ particle-based.

Example 7: Tin (Sn) Nanoparticles Encapsulated by a Sulfonated Styrene-Butadiene Rubber (S-SBR)

Nanoparticles (76 nm in diameter) of Sn were encapsulated with a thin layer of sulfonated SBR shell via the spray-drying method, followed by curing of the butadiene segment of the SBR chains to impart high elasticity to the SBR. For comparison, some amount of Sn nanoparticles was encapsulated by a carbon shell. Carbon encapsulation is well-known in the art. Un-protected Sn nanoparticles from the same batch were also investigated to determine and compare the cycling behaviors of the lithium-ion batteries containing these particles as the anode active material.

Figure 7:
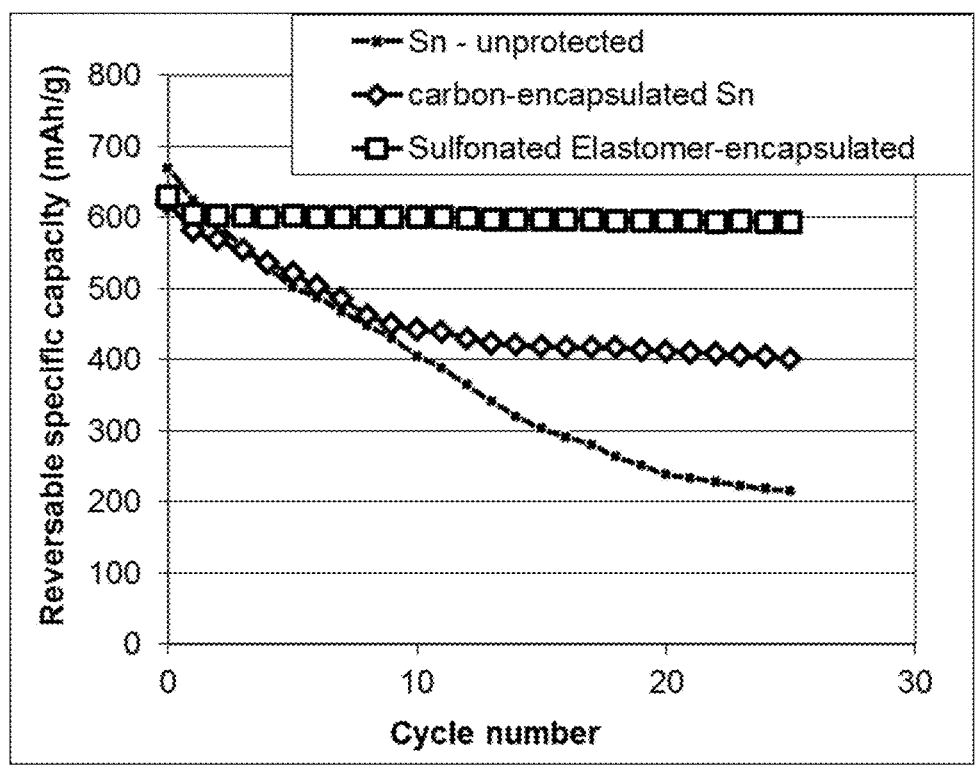
FIG. 7 The specific capacity of a lithium battery having an anode active material featuring sulfonated elastomer-encapsulated Sn particles, that having carbon-encapsulated Sn particles, and that having un-protected Sn particles.

Shown in FIG. 7 are the discharge capacity curves of three coin cells having three different Sn particles as the anode active material: sulfonated elastomer-encapsulated Sn particles, carbon-encapsulated Sn particles, and un-protected Sn particles. These results have clearly demonstrated that sulfonated elastomer encapsulation strategy provides the very best protection against capacity decay of a lithium-ion battery featuring a high-capacity anode active material. Carbon encapsulation is not good enough to provide the necessary protection.

Example 8: Si Nanowire-Based Particulates

Figure 8:
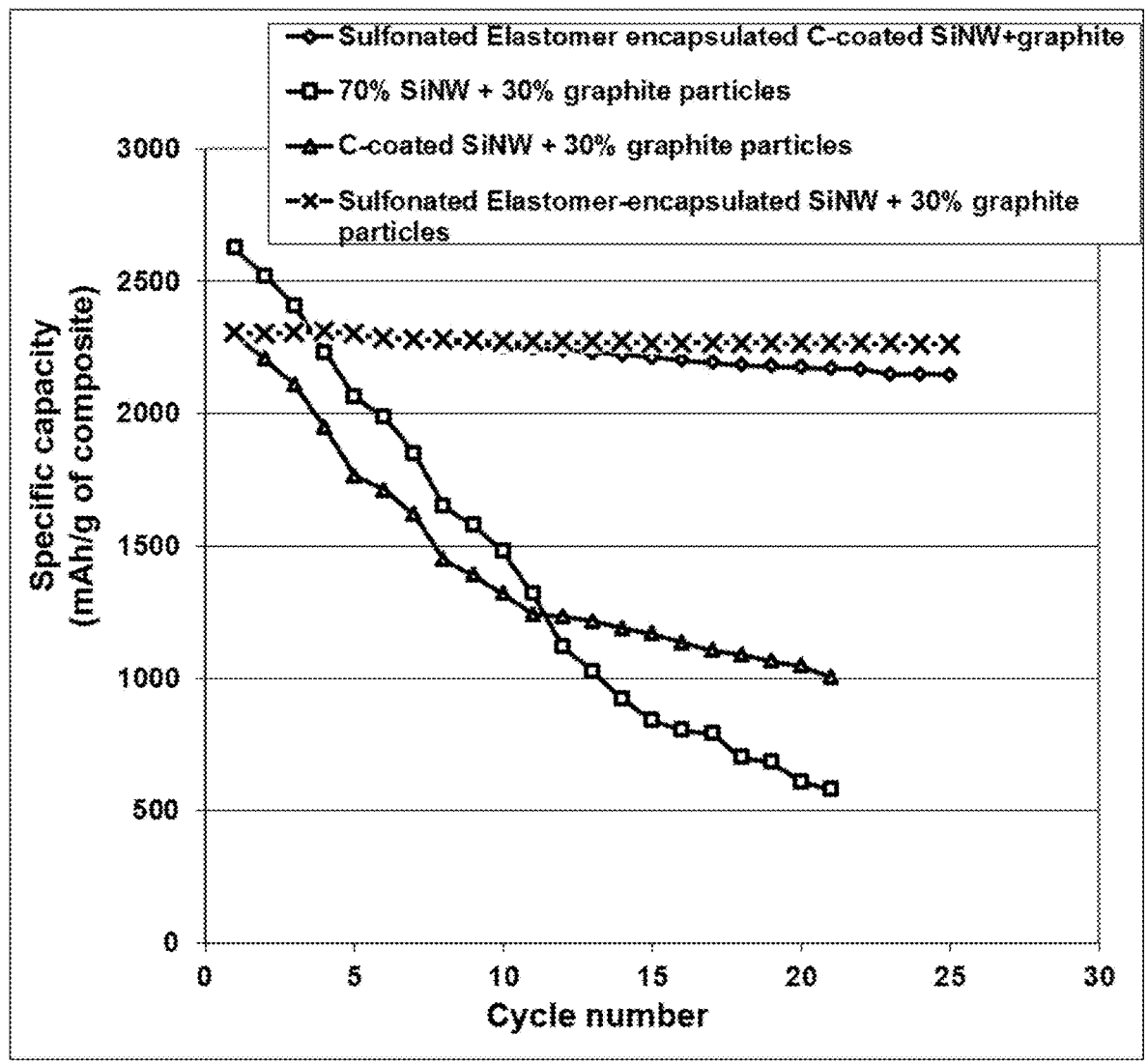
FIG. 8 Specific capacities of 4 lithium-ion cells having Si nanowires (SiNW) as an anode active material: unprotected SiNW, carbon-coated SiNW, sulfonated elastomer-encapsulated SiNW, and sulfonated elastomer-encapsulated carbon-coated SiNW.

Si nanowires were supplied from Angstron Energy Co. (Dayton, Ohio). Some Si nanowires were encapsulated with sulfonated cis-polyisoprene elastomer. Some Si nanowires were coated with a layer of amorphous carbon and then encapsulated with sulfonated cis-polyisoprene elastomer. For comparison purposes, Si nanowires unprotected and protected by carbon coating (but no elastomer encapsulation), respectively, were also prepared and implemented in a separate lithium-ion cell. In all four cells, approximately 25-30% of graphite particles were mixed with the protected or unprotected Si nanowires (SiNW), along with 5% binder resin, to make an anode electrode. The cycling behaviors of these 4 cells are shown in FIG. 8, which indicates that sulfonated elastomer encapsulation of Si nanowires, with or without carbon coating, provides the most stable cycling response. Carbon coating alone does not help to improve cycling stability by much.

Example 9: Effect of Lithium Ion-Conducting Additive in a Sulfonated Elastomer Shell A wide variety of lithium ion-conducting additives were added to several different sulfonated elastomer matrix materials to prepare encapsulation shell materials for protecting core particles of an anode active material. We have discovered that these sulfonated elastomer-additive composite materials are suitable encapsulation shell materials provided that their lithium ion conductivity at room temperature is no less than $10^{-7}$ S/cm. With these materials, lithium ions appear to be capable of readily diffusing in and out of the encapsulation shell having a thickness no greater than 1 µm. For thicker shells (e.g. 10 µm), a lithium ion conductivity at room temperature no less than $10^{-4}$ S/cm would be required.

TABLE 2

Lithium ion conductivity of various sulfonated elastomer composite compositions as a shell material for protecting anode active material particles.

| Sample No. | Lithium-conducting additive | Sulfonated elastomer (1-2 μm thick) | Li-ion conductivity (S/cm) |
|---|---|---|---|
| E-1 | $Li_2CO_3 + (CH_2OCO_2Li)_2$ | 70-99% polyurethane | $3.4 \times 10^{-6}$ to $5.6 \times 10^{-3}$ S/cm |
| E-2 | $Li_2CO_3 + (CH_2OCO_2Li)_2$ | 65-99% polyisoprene | $8.2 \times 10^{-6}$ to $6.6 \times 10^{-4}$ S/cm |
| E-3 | $Li_2CO_3 + (CH_2OCO_2Li)_2$ | 65-99% SBR | $1.5 \times 10^{-5}$ to $7.2 \times 10^{-4}$ S/cm |
| D-4 | $Li_2CO_3 + (CH_2OCO_2Li)_2$ | 70-99% urethane-urea | $1.8 \times 10^{-6}$ to $1.3 \times 10^{-3}$ S/cm |
| D-5 | $Li_2CO_3 + (CH_2OCO_2Li)_2$ | 75-99% polybutadiene | $1.5 \times 10^{-5}$ to $8.4 \times 10^{-3}$ S/cm |
| B1 | $LiF + LiOH + Li_2C_2O_4$ | 80-99% chloroprene rubber | $9.7 \times 10^{-7}$ to $4.8 \times 10^{-4}$ S/cm |
| B2 | LiF + HCOLi | 80-99% EPDM | $3.4 \times 10^{-6}$ to $9.6 \times 10^{-4}$ S/cm |
| B3 | LiOH | 70-99% polyurethane | $4.28 \times 10^{-5}$ to $4.8 \times 10^{-3}$ S/cm |
| B4 | $Li_2CO_3$ | 70-99% polyurethane | $6.6 \times 10^{-5}$ to $6.7 \times 10^{-3}$ S/cm |
| B5 | $Li_2C_2O_4$ | 70-99% polyurethane | $1.5 \times 10^{-5}$ to $9.5 \times 10^{-4}$ S/cm |
| B6 | $Li_2CO_3$ + LiOH | 70-99% polyurethane | $2.4 \times 10^{-5}$ to $3.2 \times 10^{-3}$ S/cm |
| C1 | $LiClO_4$ | 70-99% urethane-urea | $6.6 \times 10^{-5}$ to $4.3 \times 10^{-3}$ S/cm |
| C2 | $LiPF_6$ | 70-99% urethane-urea | $4.5 \times 10^{-5}$ to $1.1 \times 10^{-3}$ S/cm |
| C3 | $LiBF_4$ | 70-99% urethane-urea | $2.2 \times 10^{-5}$ to $3.3 \times 10^{-4}$ S/cm |
| C4 | LiBOB + $LiNO_3$ | 70-99% urethane-urea | $9.4 \times 10^{-6}$ to $3.1 \times 10^{-4}$ S/cm |
| S1 | Sulfonated polyaniline | 85-99% SBR | $8.3 \times 10^{-6}$ to $6.3 \times 10^{-4}$ S/cm |
| S2 | Sulfonated SBR | 85-99% SBR | $6.8 \times 10^{-6}$ to $4.5 \times 10^{-4}$ S/cm |
| S3 | Sulfonated PVDF | 80-99% chlorosulfonated polyethylene (CS-PE) | $4.5 \times 10^{-6}$ to $4.7 \times 10^{-4}$ S/cm |
| S4 | Polyethylene oxide | 80-99% CS-PE | $6.1 \times 10^{-6}$ to $5.8 \times 10^{-4}$ S/cm |

Example 10: Cycle Stability of Various Rechargeable Lithium Battery Cells

In lithium-ion battery industry, it is a common practice to define the cycle life of a battery as the number of charge-discharge cycles that the battery suffers 20% decay in capacity based on the initial capacity measured after the required electrochemical formation. Summarized in Table 3 below are the cycle life data of a broad array of batteries featuring presently disclosed sulfonated elastomer-encapsulated anode active material particles vs. other types of anode active materials.

TABLE 3

Cycle life data of various lithium secondary (rechargeable) batteries.

| Sample ID | protective means (elastomers all sulfonated) | Type & % of anode active material | Initial capacity (mAh/g) | Cycle life (No. of cycles) |
|---|---|---|---|---|
| Si-1 | SBR-encapsulation | 25% by wt. Si nanoparticles (80 nm) + 67% graphite + 8% binder | 1,120 | 1,250-1,590 |
| Si-2 | carbon encapsulation | 25% by wt. Si nanoparticles (80 nm) | 1,242 | 255 |
| SiNW-1 | urea-urethane encapsulation | 35% Si nanowires (diameter = 90 nm) | 1,258 | 1,560 |
| SiNW-2 | ethylene oxide-epichlorohydrin copolymer | 45% Si nanoparticles, prelithiated or non-prelithiated (no pre-Li) | 1,766 | 1,620 (prelithiated); 1,235 (no prelithiation) |
| $VO_2$-1 | polyurethane encapsulation | 90%-95%, $VO_2$ nanoribbon | 255 | 1745 |
| $CO_3O_4$-2 | polyisoprene encapsulation | 85% $CO_3O_4$ + 8% graphite platelets + binder | 720 | 2,440 (Prelithiated); 1,786 (no pre-Li) |
| $CO_3O_4$-2 | no encapsulation | 85% $CO_3O_4$ + 8% graphite platelets + binder | 725 | 266 |
| $SnO_2$-2 | polybutadiene encapsulation | 75% $SnO_2$ particles (3 μm initial size) | 740 | 1,2548 |
| $SnO_2$-2 | EPDM encapsulation | 75% $SnO_2$ particles (87 nm in diameter) | 738 | 3,334 (Pre-Li); 1,920 (non pre-Li) |
| Ge-1 | butyl rubber encapsulation of C-coated Ge | 85% Ge + 8% graphite platelets + binder | 850 | 1,354 |
| Ge-2 | carbon-coated | 85% Ge + 8% graphite platelets + binder | 856 | 120 |

TABLE 3-continued

Cycle life data of various lithium secondary (rechargeable) batteries.

| Sample ID | protective means (elastomers all sulfonated) | Type & % of anode active material | Initial capacity (mAh/g) | Cycle life (No. of cycles) |
|---|---|---|---|---|
| Al—Li-1 | polyurethane encapsulation | Al/Li alloy (3/97) particles | 2,850 | 1,675 |
| Al—Li-2 | none | Al/Li alloy particles | 2,856 | 155 |
| Zn—Li-1 | cis-polyisoprene encapsulation | C-coated Zn/Li alloy (5/95) particles | 2,626 | 1,365 |
| Zn—Li-2 | none | C-coated Zn/Li alloy (5/95) particles | 2,631 | 146 |

These data further confirm:
(1) The sulfonated elastomer encapsulation strategy is surprisingly effective in alleviating the anode expansion/shrinkage-induced capacity decay problems.
(2) The encapsulation of high-capacity anode active material particles by carbon or other non-elastomeric protective materials does not provide much benefit in terms of improving cycling stability of a lithium-ion battery
(3) Prelithiation of the anode active material particles prior to sulfonated elastomer encapsulation is beneficial.
(4) The sulfonated elastomer encapsulation strategy is also surprisingly effective in imparting stability to lithium metal or its alloy when used as the anode active material of a lithium metal battery.
(5) Sulfonation of an elastomer significantly increases the lithium-ion conductivity of the elastomer and, thereby, enables faster lithium ion transport and higher power density. Sulfonation of an encapsulating elastomer shell also improves the cycle life of a lithium battery as compared to the corresponding cells containing un-sulfonated elastomer shell.

We claim:

1. A method of producing a powder mass of an anode active material for a lithium battery, said method comprising:
(a) providing a solution containing a sulfonated elastomer dissolved in a solvent or a precursor (monomer or oligomer) to said sulfonated elastomer in a liquid form or dissolved in a solvent; wherein said sulfonated elastomer contains a material selected from sulfonated natural polyisoprene, sulfonated synthetic polyisoprene, sulfonated polybutadiene, sulfonated chloroprene rubber, sulfonated polychloroprene, sulfonated butyl rubber, sulfonated styrene-butadiene rubber, sulfonated nitrile rubber, sulfonated ethylene propylene rubber, sulfonated ethylene propylene diene rubber, sulfonated metallocene-based poly(ethylene-co-octene) elastomer, sulfonated poly(ethylene-co-butene) elastomer, sulfonated styrene-ethylene-butadiene-styrene elastomer, sulfonated epichlorohydrin rubber, sulfonated polyacrylic rubber, sulfonated silicone rubber, sulfonated fluorosilicone rubber, sulfonated perfluoroelastomers, sulfonated polyether block amides, sulfonated chlorosulfonated polyethylene, sulfonated ethylene-vinyl acetate polymer, sulfonated protein resilin, sulfonated protein elastin, sulfonated ethylene oxide-epichlorohydrin copolymer, sulfonated polyurethane, sulfonated urethane-urea copolymer, or a combination thereof;
(b) dispersing a plurality of particles of an anode active material in said solution to form a slurry; and
(c) dispensing said slurry and removing said solvent and/or polymerizing/curing said precursor to form said powder mass, wherein said powder mass comprises multiple particulates wherein at least a particulate is composed of one or a plurality of particles of an anode active material being encapsulated by a thin layer of sulfonated elastomer having a thickness from 1 nm to 10 μm, a fully recoverable tensile strain from 2% to 800%, and a lithium ion conductivity from $10^{-7}$ S/cm to $5 \times 10^{-2}$ S/cm at room temperature.

2. The method of claim 1, wherein said step of dispensing said slurry and removing said solvent and/or polymerizing/curing said precursor to form said powder mass includes operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

3. The method of claim 1, wherein said step of providing said solution includes (a) sulfonating an elastomer to form said sulfonated elastomer and dissolving said sulfonated elastomer in said solvent to form said solution, or (b) sulfonating said precursor to obtain a sulfonated precursor (sulfonated monomer or sulfonated oligomer), polymerizing said sulfonated precursor to form said sulfonated elastomer and dissolving said sulfonated elastomer in said solvent to form said solution.

4. The method of claim 1, wherein said anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li having at least 60% by weight of lithium element therein; and (h) combinations thereof.

5. The method of claim 1, wherein said anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein $1 \leq x \leq 2$.

6. The method of claim 1, wherein said anode active material is in a form of nanoparticle, nanowire, nanofiber, nanotube, nanosheet, nanobelt, nanoribbon, nanodisc, nanoplatelet, or nanohorn having a thickness or diameter from 0.5 nm to 100 nm.

7. The method of claim 1, wherein one or a plurality of said anode active material particles is coated with a layer of carbon prior to step (b).

8. The method of claim 1, wherein said slurry further contains a graphite or carbon material selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

9. The method of claim 1, wherein said step (a) further includes dissolving or dispersing from 0.1% to 40% by weight of a lithium ion-conducting additive in said solution.

10. The method of claim 9, wherein said lithium ion-conducting additive is selected from $Li_2CO_3$, $Li_2O$, $Li_2C_2O_4$, LiOH, LiX, $ROCO_2Li$, HCOLi, ROLi, $(ROCO_2Li)_2$, $(CH_2OCO_2Li)_2$, $Li_2S$, $Li_xSO_y$, or a combination thereof, wherein X=F, Cl, I, or Br, R=a hydrocarbon group, $0 \leq x \leq 1$, $1 \leq y \leq 4$.

11. The method of claim 9, wherein said lithium ion-conducting additive contains a lithium salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate, ($LiCF_3SO_3$), bis-trifluoromethyl sulfonylimide lithium (LiN$(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates, ($LiPF_3(CF_2CF_3)_3$), lithium bisperfluoroethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, or a combination thereof.

12. The method of claim 1, wherein said slurry further contains an electron-conducting polymer selected from polyaniline, polypyrrole, polythiophene, polyfuran, a bi-cyclic polymer, a sulfonated derivative thereof, or a combination thereof.

13. The method of claim 1, wherein said slurry further contains a lithium ion-conducting polymer selected from poly(ethylene oxide) (PEO), polypropylene oxide (PPO), poly(acrylonitrile) (PAN), poly(methyl methacrylate) (PMMA), poly(vinylidene fluoride) (PVDF), poly bis-methoxy ethoxyethoxide-phosphazenes, polyvinyl chloride, polydimethylsiloxane, poly(vinylidene fluoride)-hexafluoropropylene (PVDF-HFP), a sulfonated derivative thereof, or a combination thereof.

14. The method of claim 1, wherein said high-capacity anode active material is prelithiated to contains from 0.1% to 54.7% by weight of lithium prior to step (b).

15. The method of claim 1, wherein said sulfonated elastomer is obtained by exposing an elastomer to a treatment selected from (i) exposure to sulfur trioxide in vapor phase or in solution, optionally in presence of Lewis bases such as triethyl phosphate, tetrahydrofuran, dioxane, or amines; (ii) exposure to chlorosulfonic acid in diethyl ether; (iii) exposure to concentrated sulfuric acid or a mixture of sulfuric acid with alkyl hypochlorite; (iv) exposure to a bisulfite combined to dioxygen, hydrogen peroxide, metallic catalysts, or peroxo derivates; (v) exposure to acetyl sulfate; or a combination thereof.

16. A method of producing a sulfonated powder mass of an anode active material for a lithium battery, said method comprising:
(A) providing a solution containing an elastomer dissolved in a solvent or an precursor to said elastomer in a liquid form or dissolved in a solvent; wherein the elastomer is a sulfonated elastomer containing a material selected from sulfonated natural polyisoprene, sulfonated synthetic polyisoprene, sulfonated polybutadiene, sulfonated chloroprene rubber, sulfonated polychloroprene, sulfonated butyl rubber, sulfonated styrene-butadiene rubber, sulfonated nitrile rubber, sulfonated ethylene propylene rubber, sulfonated ethylene propylene diene rubber, sulfonated metallocene-based poly(ethylene-co-octene) elastomer, sulfonated poly(ethylene-co-butene) elastomer, sulfonated styrene-ethylene-butadiene-styrene elastomer, sulfonated epichlorohydrin rubber, sulfonated polyacrylic rubber, sulfonated silicone rubber, sulfonated fluorosilicone rubber, sulfonated perfluoroelastomers, sulfonated polyether block amides, sulfonated chlorosulfonated polyethylene, sulfonated ethylene-vinyl acetate polymer, sulfonated protein resilin, sulfonated protein elastin, sulfonated ethylene oxide-epichlorohydrin copolymer, sulfonated polyurethane, sulfonated urethane-urea copolymer, or a combination thereof;
(B) dispersing a plurality of particles of an anode active material in said solution to form a slurry;
(C) dispensing said slurry and removing said solvent and/or polymerizing/curing said precursor to form a powder mass, wherein said powder mass comprises multiple particulates wherein at least a particulate is composed of one or a plurality of particles of an anode active material being encapsulated by a thin layer of elastomer having a thickness from 1 nm to 10 μm; and
(D) sulfonating said thin layer of elastomer by exposing said powder mass to a sulfonating agent to form said sulfonated powder mass containing sulfonated elastomer-encapsulated particles, wherein sulfonated elastomer has a fully recoverable tensile strain from 2% to 800%, and a lithium ion conductivity from $10^{-7}$ S/cm to $5 \times 10^{-2}$ S/cm at room temperature.

17. The method of claim 16, wherein said sulfonating agent is selected from sulfuric acid, sulfonic acid, sulfur trioxide, chlorosulfonic acid, a bisulfate, a sulfate, or a mixture thereof.

18. The method of claim 1, further comprising mixing multiple particulates of said anode active material, a binder resin, and an optional conductive additive to form an anode active material layer, which is optionally coated on an anode current collector.

19. The method of claim 18, further comprising combining said anode active material layer, a cathode layer, an electrolyte, and an optional porous separator into a lithium battery cell.

* * * * *